Aug. 26, 1924.

R. H. FENN 1,506,116

AUTOMATIC BOX MACHINE

Original Filed Dec. 26, 1918    9 Sheets-Sheet 1

INVENTOR
Robert H. Fenn

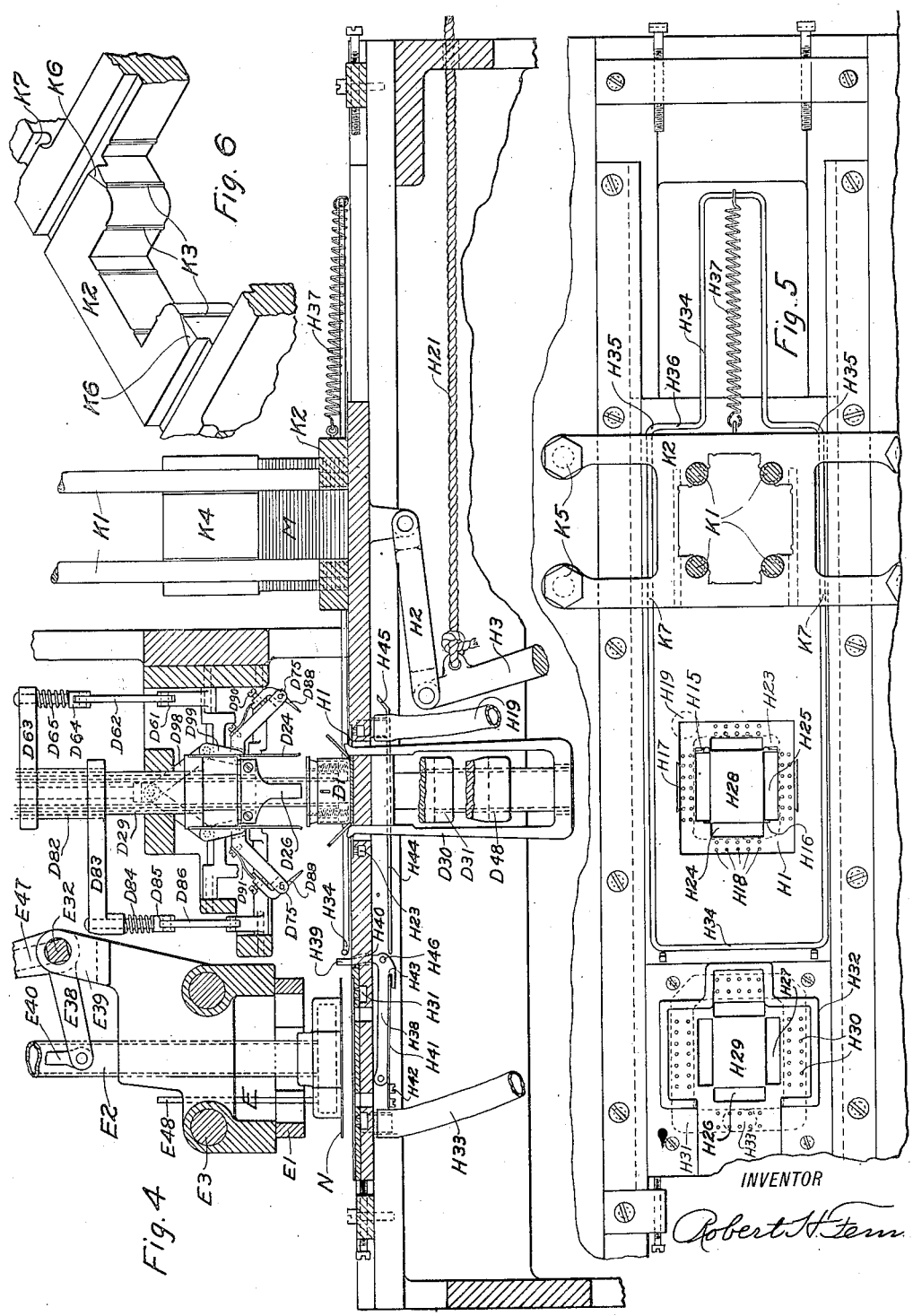

Aug. 26, 1924.

R. H. FENN 1,506,116

AUTOMATIC BOX MACHINE

Original Filed Dec. 26, 1918      9 Sheets-Sheet 3

INVENTOR

Robert H. Fenn

Aug. 26, 1924.

R. H. FENN 1,506,116

AUTOMATIC BOX MACHINE

Original Filed Dec. 26, 1918    9 Sheets-Sheet 4

INVENTOR
Robert H. Fenn

Aug. 26, 1924.

R. H. FENN

AUTOMATIC BOX MACHINE 1,506,116

Original Filed Dec. 26, 1918    9 Sheets-Sheet 5

INVENTOR

Robert H. Fenn

Aug. 26, 1924.
R. H. FENN
1,506,116
AUTOMATIC BOX MACHINE
Original Filed Dec. 26, 1918    9 Sheets-Sheet 6
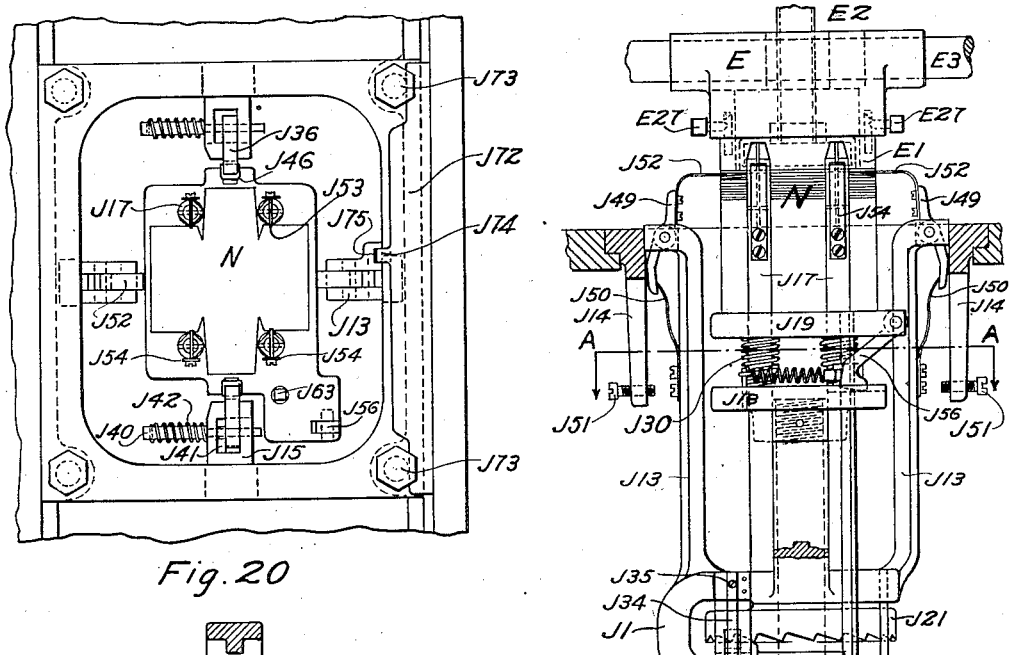
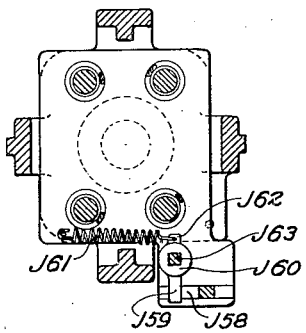
Fig. 20
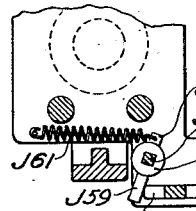
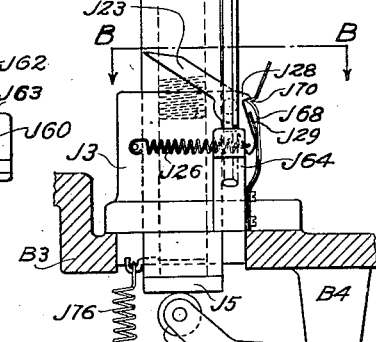
Fig. 19
Fig. 21      Fig. 22
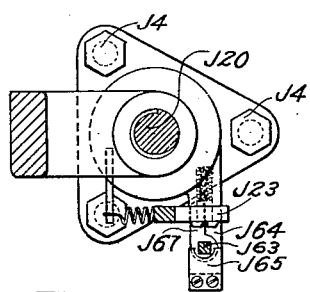    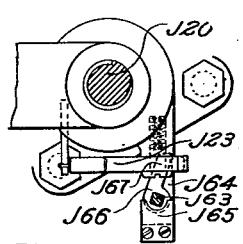
Fig. 23      Fig. 24
INVENTOR
Robert H. Fenn

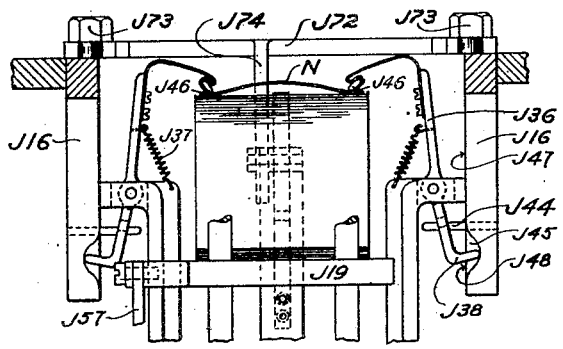
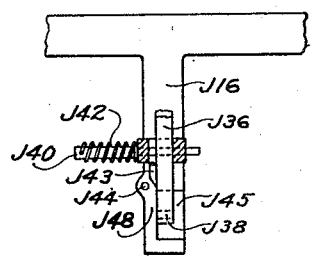
Fig. 25  Fig. 26
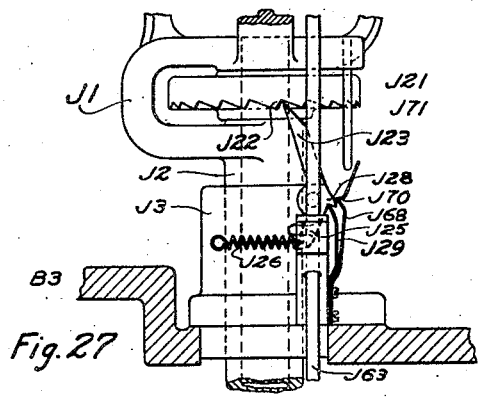
Fig. 27
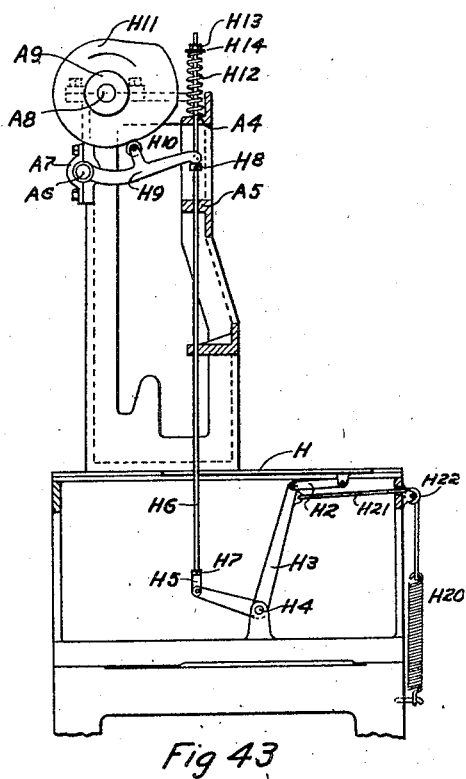
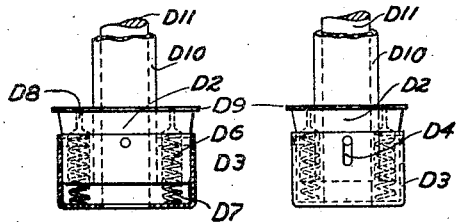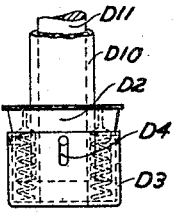
Fig. 28  Fig. 29
Fig. 43
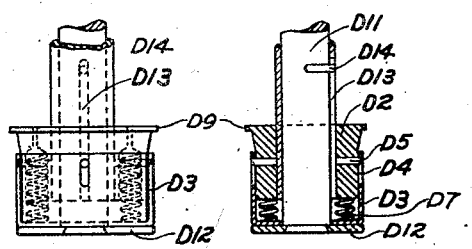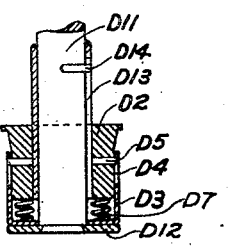
Fig. 30  Fig. 31
INVENTOR
Robert H. Fenn

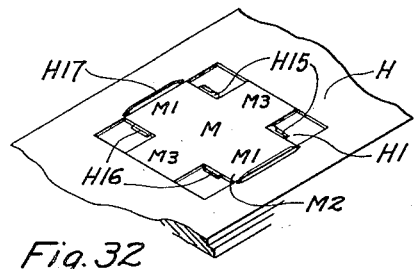
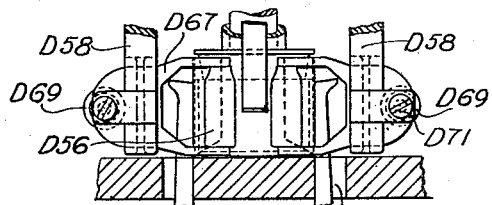
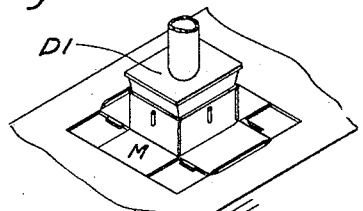
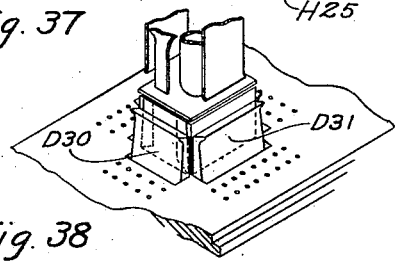
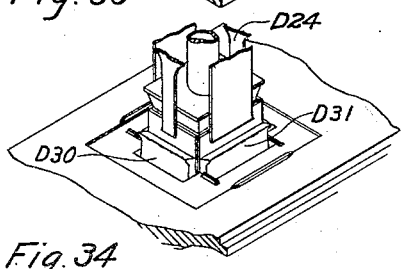
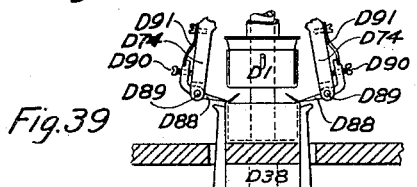
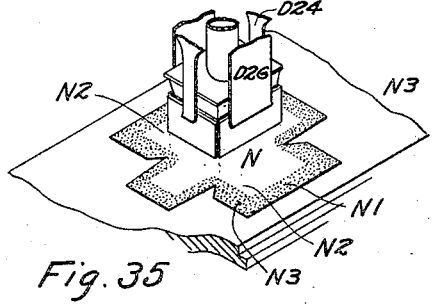
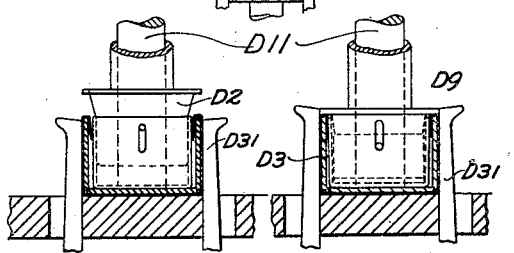
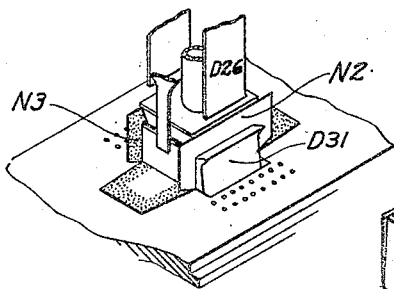
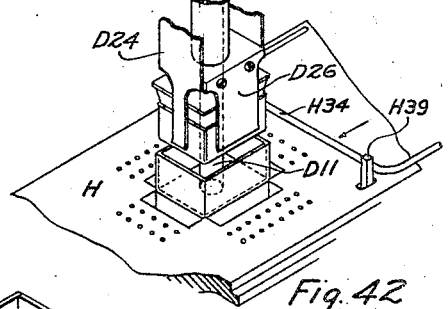
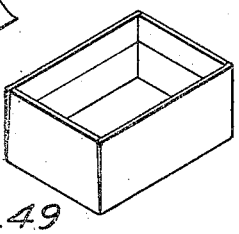

Aug. 26, 1924.

R. H. FENN 1,506,116

AUTOMATIC BOX MACHINE

Original Filed Dec. 26, 1918    9 Sheets-Sheet 9

INVENTOR

Robert H. Fenn

Patented Aug. 26, 1924.

1,506,116

UNITED STATES PATENT OFFICE.

ROBERT H. FENN, OF WHITESTONE, NEW YORK.

AUTOMATIC BOX MACHINE.

Application filed December 26, 1918, Serial No. 268,296. Renewed December 6, 1923.

*To all whom it may concern:*

Be it known that I, ROBERT H. FENN, a citizen of the United States, and resident of Whitestone, in the county of Queens and State of New York, have invented certain new and useful Improvements in Automatic Box Machines, of which the following is a specification.

This invention relates to machines for automatically, continuously and rapidly making boxes from cardboard and paper.

The prime object of this invention is to provide a machine that requires nothing further from the operator, toward the making of a box, than the filling, from time to time, of the box blank and box label magazines and the adhesive reservoir; the entire operation of making a box being performed entirely automatically by the machine.

One of the objects of this invention is to provide a machine that will automatically feed a cardboard body blank from a magazine to a mechanism adapted to fold it up into box form around a plunger.

Another object is to provide a mechanism comprising a magazine adapted to carry a stack of cut cover labels and means for extracting them singly therefrom by a carrier.

Another object is to provide a mechanism for applying adhesive to a die carried by said carrier, so that adhesive may be imprinted on the top label of the stack aforementioned.

Another object is to provide means for delivering labels coated with adhesive, singly, to position within a box covering mechanism, under a folded box blank, so that it can be folded by said mechanism, around said box blank, over its upper edges and thence, downwardly inside making a complete box, entirely automatically, from the box blank, box label and adhesive.

The type of box made by this machine is shown in Fig. 49, consisting of a box blank cut as shown in Fig. 32, bent up and covered by a glued box label N shown in Fig. 35; in a form having a bottom and side walls with the top open.

This invention consists of a single organized machine comprising several interdependent and harmoniously operating mechanisms.

The invention is shown in the several sheets of accompanying drawings, in which—

Fig. 4 is a section, forward to rear, of the machine about on the line B B of Fig. 1, through the feed slide and box covering mechanism, part in elevation and part in section for clearness.

Fig. 5 is a plan view of the feed slide and magazine base.

Fig. 6 is a partial view of the magazine base from the under side.

Fig. 19 is a front view of the label feeding mechanism with the magazine in its highest position.

Fig. 20 is a plan view of the label feeding mechanism.

Fig. 21 is a view of a section on the line A A of Fig. 17.

Fig. 22 is a view of a section on the line A A of Fig. 19.

Fig. 23 is a view of a section on the line B B of Fig. 17.

Fig. 24 is a view of a section on the line B B of Fig. 19.

Fig. 25 is a front view of a portion of the label feeding mechanism, showing a stack of labels, the upper one being separated from those beneath.

Fig. 26 is a view of a portion of the label feeding mechanism showing cam that operates the separating levers.

Fig. 27 is a view of the lower portion of the label feed-mechanism showing the pawl about to engage the teeth of the ratchet wheel.

Fig. 28 is a side sectional view of the expansible plunger, showing a central plunger without an extended foot.

Fig. 29 is an end view of the expansible plunger.

Fig. 30 is a side view of the expansible plunger, the central plunger provided with an extended foot.

Fig. 31 is an end sectional view of the plunger shown in Fig. 30.

Fig. 32 shows a portion of the feed slide with a box blank in the recess.

Fig. 33 shows a portion of the feed slide, with box blank in recess, and expansible plunger lowered upon it.

Fig. 34 shows a portion of the feed slide, with box blank folded up around expansible plunger, and held to plunger by clips.

Fig. 35 shows box blank raised and slide carrying adhesive coated label underneath.

Fig. 36 shows sides of box label folded up against folded box blank.

Fig. 37 shows end flaps, of box label, folded around ends of folded box blank.

Fig. 38 shows end of box label folded up against folded box blank.

Fig. 39 shows edges of box label, projecting above top edges of box, being folded inwardly.

Fig. 40 shows edges of box label folded down and inwardly into box by expansible plunger.

Fig. 41 shows expansible plunger at lowest position with sides expanded.

Fig. 42 shows expansible plunger withdrawn, central plunger ready to be, and box completed.

Fig. 43 shows a side view of the cam $H^{11}$ and the mechanism operating the feed slide.

Fig. 49 shows a completed box.

A general description of the machine with its co-ordinated mechanisms is as follows:—

For brevity, the cardboard blank M in Fig. 32 (which may be made of any other material adaptable for the purpose) which is scored and cut, or blanked out on a press, from which the body of the box is made, will hereinafter be designated as "box blank."

Similarly the paper blank used to cover the cardboard body of the box N Fig. 35, which is also blanked out on another machine, will hereinafter be referred to as a "box label."

Figures 1, 2:
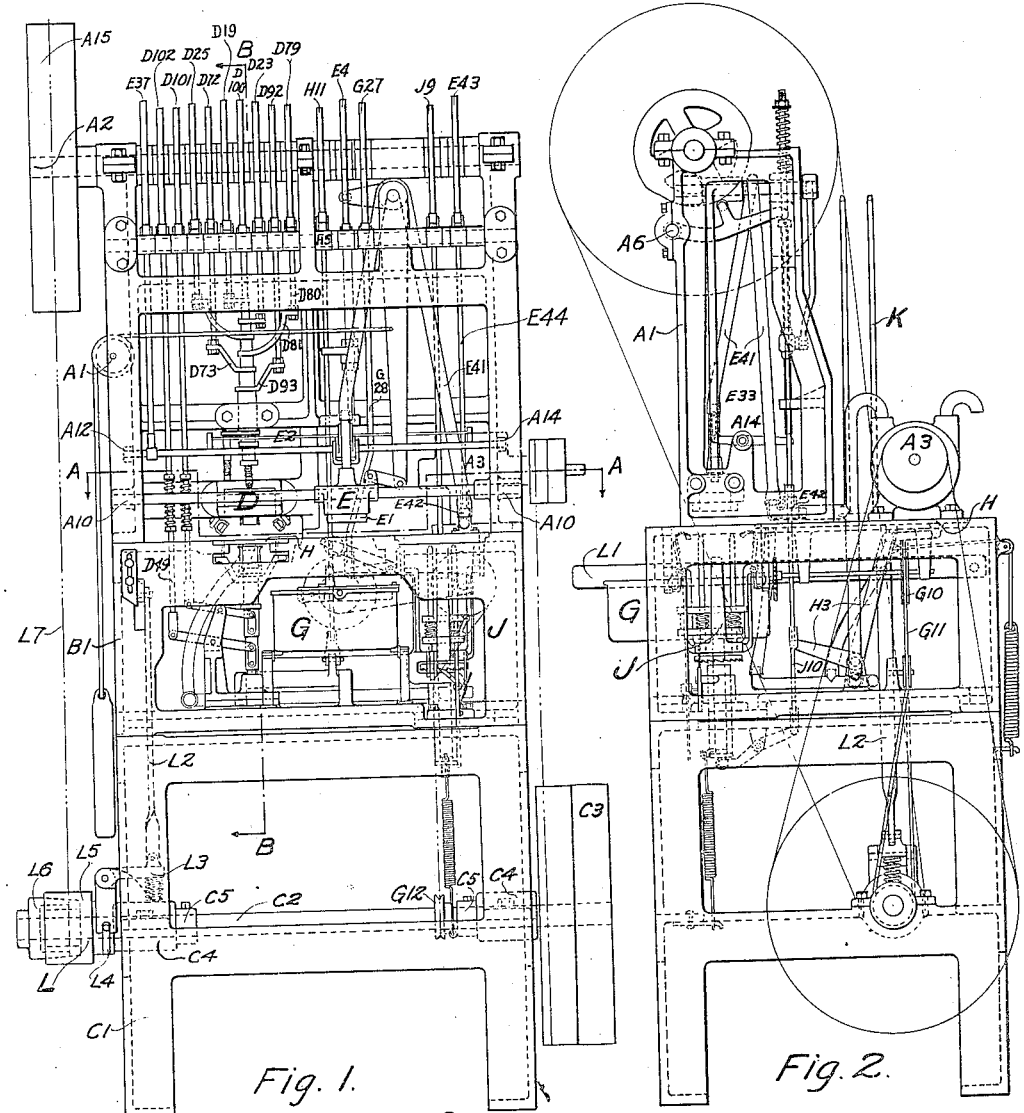
Fig. 1 is a front view of the assembled machine.
Fig. 2 is a side view of the assembled machine.
Figure 3:
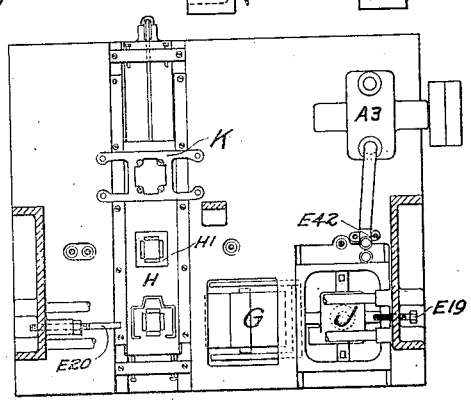
Fig. 3 is a plan view of the table, with the upper mechanism removed, about on the line A A of Fig. 1, partly in section.

In Figs. 1, 2 and 3, $A^1$ is the upper frame which carries the cam shaft $A^2$, cams and their train of operating parts; D the upper and lower box covering mechanism and E the carriage which carries the die $E^1$ and the suction plunger $E^2$; $A^3$ the exhauster, and K the box blank magazine.

$B^1$ is the middle or table frame which carries the lower box covering mechanism, below D; G the adhesive applying device; the feed slide mechanism H; $L^1$ the lever for starting and stopping the machine and J the box label magazine and feeding mechanism.

$C^1$ is the lower frame carrying the drive shaft $C^2$ and the clutch mechanism L.

A specific description of the machine and its operation follows:—

The box blanks are stacked one above the other, scored side down, within the four rods $K^1$, Fig. 4, which are supported by the base $K^2$.

The base $K^2$ has an opening through it similar in shape to the box blank M, but slightly larger. In order to insure that each blank will be centrally delivered, the ribs $K^3$, spaced at intervals, vertically, on the inner walls of the base $K^2$ are made so that they just touch the edges of a box blank of standard size. Their function is to make it possible for a blank that may be a little larger than standard to pass through the base $K^2$ without too much friction. A weight $K^4$ adapted to slidably fit between the rods $K^1$ is placed upon the top of the stack of box blanks, to cause them to move downwardly through the opening in the base $K^2$.

The whole magazine K is placed centrally over the feed slide H, so that when it makes its rear stroke, the box blank recess $H^1$ registers with the opening in the base $K^2$, and a box blank immediately drops into the recess. The recess $H^1$ is approximately as deep as the box blank is thick. The base $K^2$ is so positioned that the slide H will just pass under it, therefore when the forward motion of slide H takes place the box blank, that has dropped into the recess $H^1$, is carried out, from under the stack of box blanks, with the slide.

The base $K^2$ is adjustable as to clearance above the slide H by washer shims between the base $K^2$ and the table $B^1$, around the cap screws $K^5$.

The clearance is made just enough so that only one box blank can be extracted, at a time, as the slide H moves forward.

Sometimes the sides of the box blank $M^1$ Fig. 32, warp and turn up at the edges $M^2$, so that sufficient weight cannot be put on the stack of blanks to cause the bottom one to lie flat in the recess. If a blank in this condition is extracted from the magazine $K^2$ without provision for these edges, they will be crushed back, and an imperfect or no box would result. In order to prevent this, the forward lower edges of the opening through the base $K^2$, where they are adjacent to the sides of the box blank, are bevelled upwardly toward the back as shown at $K^6$ Fig. 6. These bevelled edges gradually force the up turned edges of the box blank sides down, until they pass under the base $K^2$ without being crushed or mutilated.

In the bottom of the recess $H^1$ are small ribs $H^{15}$ which are so placed that they engage the rearward edges of the sides of the box blank. The ribs $H^{16}$ engage the front edges of the sides. Their purpose is to centre the box blank, should for any reason, the ends $M^3$ be warped so they lie higher than the surface of the slide H. The ribs $H^{15}$ also serve to push the box blank M from under the pile in the magazine, should the rear end of box blank $M^3$ lie higher than the surface of the slide H.

The side ribs $H^{17}$ are so placed that they snugly engage the sides of the box blank M, and maintain it in position in the recess when the slide moves forward.

In order to further assure that the box blank M will be held in the recess $H^1$, air suction may be applied through the suction holes $H^{18}$. These holes lead into an air duct $H^{23}$ which is connected through the pipe $H^{19}$ to the exhauster $A^3$.

The reciprocation of the feed slide H is effected by means of the link $H^2$, Fig. 43, the bell crank lever $H^3$ pivotally supported at $H^4$ and the rod end $H^5$, into which the cam rod $H^6$ is screwed and locked in position by jam nut $H^7$. This feature provides for changing the position of the stroke of the slide; decreasing the effective length of the cam rod throws the slide stroke farther to the rear, increasing it throws the stroke to the front.

The cam rod $H^6$ passes through bearings in the flanges $A^4$ and $A^5$. Mounted on the cam rod, and pinned to it, is the cam washer $H^8$, on this rests the forked end of the cam lever $H^9$, the cam rod $H^6$ passing between the arms of the fork. The cam lever $H^9$ is pivotally mounted on the cam lever shaft $A^6$ (which incidentally supports all the cam levers) and which is carried in bearings on the frame $A^1$. By removing the caps $A^7$ the cam lever shaft and cam levers can all be removed from the machine without disturbing any other parts of the machine. Half way between the point where the forked end of cam lever $H^9$ rests on the cam washer $H^8$ and the centre of the shaft $A^6$, a cam roller $H^{10}$ is mounted on cam lever $H^9$ so as to roll against the face of the feed slide cam $H^{11}$, mounted on the cam shaft $A^8$, carried in bearings in the frame $A^1$. (Incidentally the cam shaft $A^8$ carries all the upper cams). By removing the caps $A^9$ all the cams, mounted on the cam shaft, can be removed without disturbing any other parts of the machine.

The upper end of cam rod $H^6$ is threaded, and around this rod, and resting on the web $A^4$ is the compression spring $H^{12}$. A nut $H^{13}$ and washer $H^{14}$ hold this spring in place and provide means for changing the spring tension. As the cam $H^{11}$ revolves the spring $H^{12}$ pulls the cam rod $H^6$ upwardly causing the cam washer $H^8$ to press the cam lever $H^9$ upwardly, and incidentally presses the cam roller $H^{10}$ against the face of the cam $H^{11}$, over which it rolls as the cam revolves, and thereby, through the train of mechanism described, causes the feed slide to reciprocate as determined by the outline of the cam $H^{11}$.

In order to relieve the train of mechanism of the strain of an inordinately heavy spring $H^{12}$, an auxiliary spring $H^{20}$ is provided, the lower end fixed and the upper end attached, by means of a rope $H^{21}$ running over a pulley $H^{22}$, to the slide H. Therefore when the slide moves forward the spring $H^{20}$ is stretched, and when slide returns, the spring $H^{20}$ contracts and aids in returning slide to rear position.

When the slide H moves to forward position the box blank M is centred directly under the plunger $D^1$, ($D^1$ designates the plunger as a whole) which thereupon descends upon and firmly holds it in place.

The plunger, shown in detail in Figs. 28, 29, 30, and 31, consists essentially of a solid central portion $D^2$ and an outer shell $D^3$, made of a resilient material such as spring steel, bent up into the form shown, so that it fits snugly and slidably about the lower portion of $D^2$.

Through each of the sides of the shell $D^3$ a slot $D^4$ is cut. In each side of $D^3$ a pin $D^5$ is fastened so that it projects into but not through the slot $D^4$. The end of each pin $D^5$ is bevelled downwardly toward the plunger which allows the shell $D^4$ to be pushed up and snapped over the pin $D^5$, said pins slipping into said slots $D^4$.

The upper end of the slots striking against the pins $D^5$ prevent the shell $D^3$ from leaving the solid plunger $D^2$. In $D^2$ there are spring pockets $D^6$, into which springs $D^7$, under compression, are placed. The springs maintain the shell $D^3$ in its lower position as shown in Fig. 28. The small holes $D^8$ are air vents.

The upper portion of $D^2$ is flared outwardly so that, when $D^2$ is depressed to its lowest position, as shown in Fig. 41, the sides of the shell $D^3$ are expanded or pushed outwardly. A flange $D^9$ surmounts the flared portion of $D^2$, the external dimensions of this flange being approximately that of the external dimensions of the finished box. Its function is, as shown in Fig. 41, to square up the top edges of the box before it is ejected from the machine.

The plunger $D^2$ is carried on the lower end of the tube $D^{10}$. Through this tube $D^{10}$ and a hole in the shell $D^3$ the central plunger $D^{11}$ operates.

This central plunger $D^{11}$ may be either plain, as shown in Fig. 28, which type is used for small boxes, or, with an extended foot $D^{12}$, as shown in Fig. 30, as used for large boxes. A central slot $D^{13}$ in the tube $D^{10}$, and a pin $D^{14}$ fastened in central plunger $D^{11}$, said pin fitting and sliding in said slot, keep the sides of the extended foot $D^{12}$ parallel to those of the plunger $D^2$ and shell $D^3$.

Figure 44:
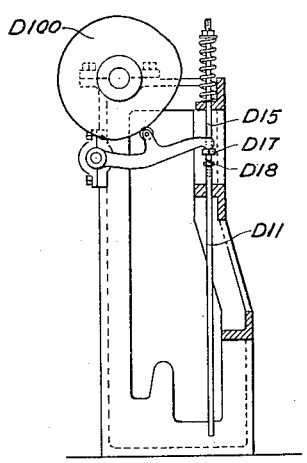
Fig. 44 is a view of the cam $D^{100}$ operating the central plunger.

The central plunger $D^{11}$ is operated directly from the cam lever as shown in Fig. 44.

It may here be remarked that all of the action and functions of the cam levers, cam rollers, cam springs, cam washers and cam rods are similar; the cam rod is given a variable reciprocated motion determined by the outline of the particular cam, and the cam rod transmits this motion to other devices to produce the specific result required.

Figure 45:
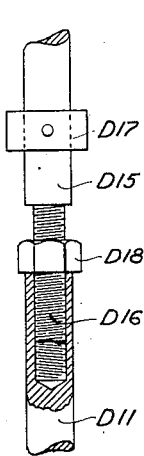
Fig. 45 is a detail of Fig. 44 showing method of fastening cam rod into central plunger.

The central plunger $D^{11}$, Fig. 44, is practically a continuation of the cam rod $D^{15}$, actuated by the cam $D^{100}$, and is fastened to it by the means shown. The lower end of cam rod $D^{15}$ is threaded and screwed into a tapped hole $D^{16}$ in the upper end of central plunger $D^{11}$ Fig. 45. This construction admits of the vertical adjustment of the central plunger $D^{11}$ relative to the cam washer $D^{17}$. A lock nut $D^{18}$ maintains any desired setting.

All of the box covering mechanism D Figs. 1 and 2, above the table $B^1$, is operated by cam rods adjustably attached to arms carried by a plurality of vertically telescoping and independently operated tubes, the lower ends of said tubes being variously attached to the direct box covering and holding devices.

Figure 46:
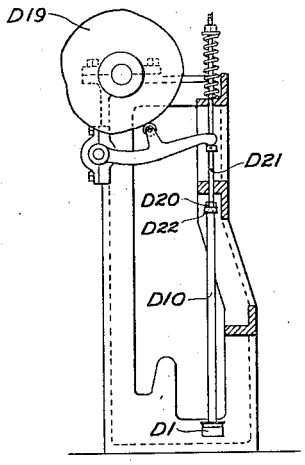
Fig. 46 is a view showing cam $D^{10}$ and intervening mechanism operating expansible plunger.

Thus the plunger $D^1$ is operated by the cam $D^{19}$ Fig. 1. Fig. 46 shows the train of mechanism, the plunger $D^1$ being carried on lower end of tube $D^{10}$. Tube $D^{10}$ is fastened to arm $D^{20}$ into which the cam rod $D^{21}$ screws. A lock nut $D^{22}$ maintains any desired setting.

Figures 7, 9:
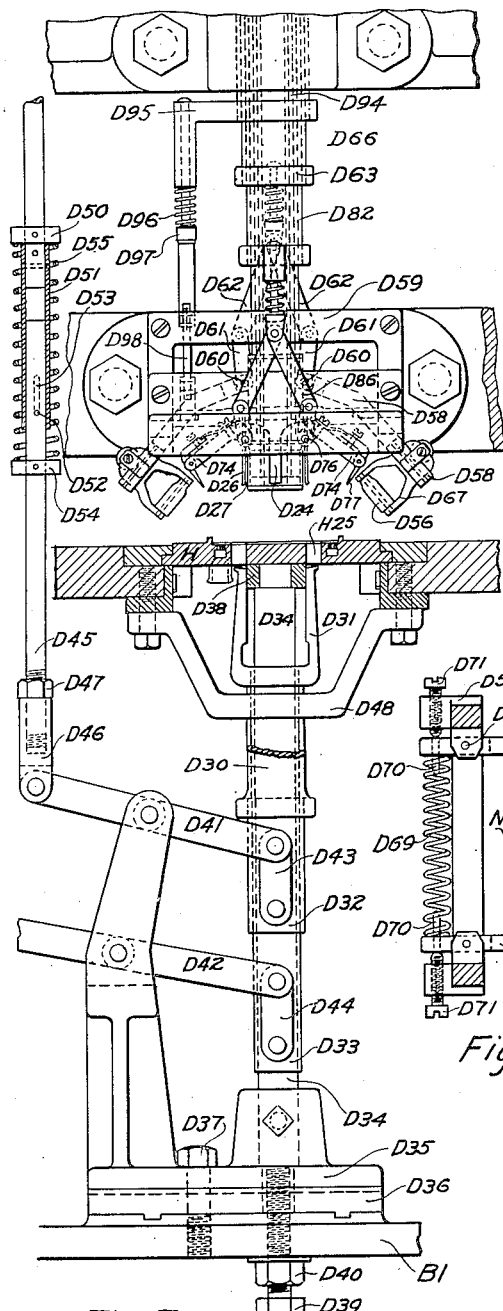
Fig. 7 is a front view of the box folding and covering mechanism.
Fig. 9 is a plan view showing a formed box blank and rollers folding the end flaps of the box label, about the ends of the formed box blank.
Figure 8:
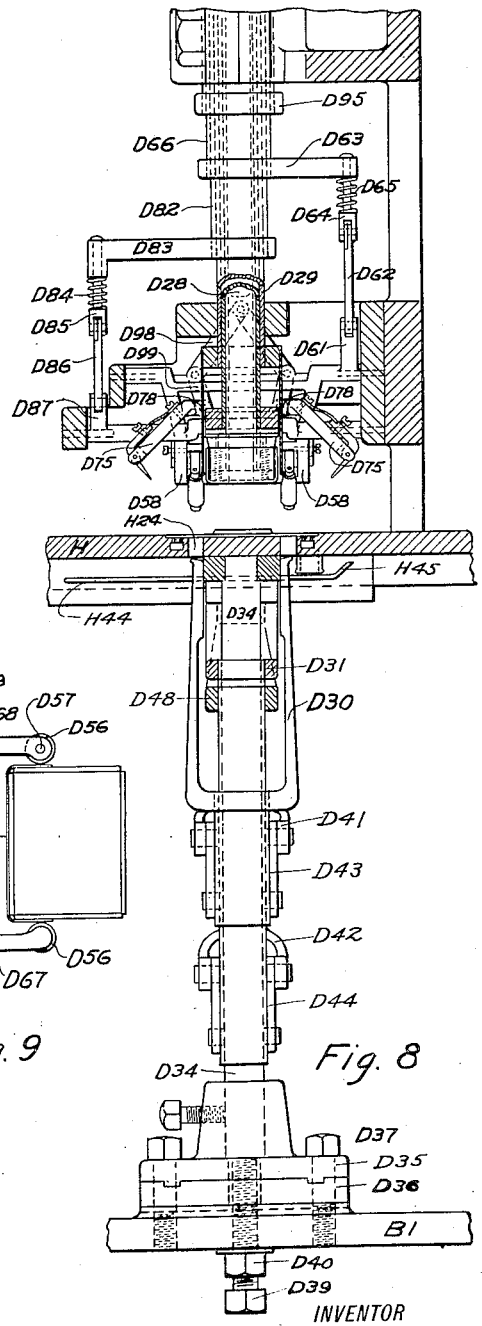
Fig. 8 is a side view, in partial section for clearness, of the box folding and covering mechanism.

In a similar way the cam $D^{25}$ operates the end clips $D^{24}$ by tube $D^{29}$ Fig. 8, and the cam $D^{28}$ operates the side clips $D^{26}$ by tube $D^{28}$. These clips are made of spring steel, so as to be somewhat flexible, and are so spaced relative to the plunger shell $D^3$ that the space between, $D^{27}$, Fig. 7, is about the thickness of the box blank.

In Figs. 7 and 8 the lower box covering mechanism is shown. $D^{30}$ are the end fingers and $D^{31}$ the side fingers. Their function is to operate upwardly through the end slots $H^{24}$ and side slots $H^{25}$ in slide H; in one operation to push the sides and ends of a box blank up around plunger $D^1$. Fig. 4 shows the fingers just starting to lift the ends. Fig. 34 shows the sides folded up around the plunger $D^1$.

Immediately the sides are folded up, the side and end clips descend and slide over the top edges of the sides, holding them snugly against the plunger $D^1$ as shown in Fig. 34. The side $D^{31}$ and end $D^{30}$ fingers then descend, and the plunger $D^1$, central plunger $D^{11}$, clips $D^{24}$ and $D^{26}$, holding folded box blank, all rise together taking box blank with them as shown in Fig. 35.

The fingers $D^{30}$ and $D^{31}$ are preferably made quite rigid so as to maintain the distance between opposite fingers approximately constant and keep the boxes that are formed between them of uniform size. For some kinds of boxes using a very thin box blank, the fingers may be made flexible.

The end fingers $D^{30}$ are carried on an outer telescoping tube $D^{32}$, sliding over a tube $D^{33}$ which carries the side fingers $D^{31}$. The tube $D^{33}$ slides upon and is guided by a central rod $D^{34}$. This rod is supported in the base $D^{35}$, which in turn sets on an intermediate base $D^{36}$. This intermediate base has slots in its upper surface fitting ribs on the under side of $D^{35}$, and ribs on its under side fitting grooves in the frame $B^1$. The upper set of ribs and grooves are at right angles to the lower set so that the base $D^{35}$ may be moved, by the sliding of ribs in grooves of either $D^{35}$ or $D^{36}$ or both, until guide rod $D^{34}$ is exactly central with the vertical axis of the plunger $D^1$. The screws $D^{37}$ hold the parts $D^{35}$ and $D^{36}$ to any desired setting.

The upper end of the guide rod $D^{34}$ is provided with a rectangular head $D^{38}$ of approximately the external dimensions of the finished box, and serves as a guide for the fingers $D^{30}$ and $D^{31}$. The guide rod $D^{34}$ is also vertically adjustable by means of the screw $D^{39}$ and lock nut $D^{40}$, and locked from turning by a set screw.

This screw $D^{39}$ is adjusted so that the rectangular head $D^{38}$ supports the central portions $H^{28}$ and $H^{29}$ of slide H, included between the rectangular slots, $H^{24}$, $H^{25}$ and $H^{26}$, $H^{27}$, respectively, whenever either central portion $H^{28}$ or $H^{29}$ is over the head $D^{38}$.

The base $D^{35}$ also carries a standard with pins and bearings for levers $D^{41}$ and $D^{42}$, $D^{41}$ being attached by links $D^{43}$ to tube $D^{32}$ and lever $D^{42}$ being attached by links to tube $D^{33}$.

Cam $D^{101}$, through its came lever and cam rod $D^{45}$, which screws into rod end $D^{46}$, and is locked in position by nut $D^{47}$, operates end fingers $D^{30}$, and in a similar way, cam $D^{102}$ operates side fingers $D^{31}$ by means of cam lever, cam rod, rod end and lever $D^{42}$, links $D^{44}$ and tube $D^{33}$. A yoke guide $D^{48}$ also slidingly supports and centres the tube $D^{33}$ and the guide rod $D^{34}$ within.

The cam rods $D^{45}$ and $D^{49}$ are made in two parts, the upper part provided with a washer $D^{50}$ (describing $D^{45}$) pinned fast, and a tube $D^{51}$ also pinned fast to said cam rod. The lower part of cam rod $D^{45}$ slidingly fits into this tube $D^{51}$. A pin $D^{52}$ passes through the rod $D^{45}$, and each end into the slots $D^{53}$ in the tube $D^{51}$. A washer $D^{54}$ is pinned to rod $D^{45}$ and a compression spring $D^{55}$ is placed around tube $D^{51}$ and between washers $D^{50}$ and $D^{54}$. The spring maintains the pin $D^{52}$ pressed against the lower ends of slots $D^{53}$, and the whole acts as a solid rod, except, when for some reason, the slots in slide H may not register with fingers $D^{30}$ and $D^{31}$; then the fingers, as they rise, strike the under side of the slide H and the spring $D^{55}$ compresses. The object of the device is to prevent the breakage of the levers $D^{41}$ and $D^{42}$, which would happen if the fingers struck the under side of the slide and no safety provision was made. The cam rod $D^{49}$ is provided with a similar safety device.

The box blank having been folded about the plunger $D^1$ and lifted with it, the slide H moves to rear position carrying with it a glued label N as shown in Fig. 35. The method of gluing, feeding and placing of the labels in the slide will be described later. Air suction through the holes $H^{30}$, which are connected to a suction air duct $H^{31}$, holds the label in position on the slide within the slight recess inside the surrounding rib $H^{32}$. The air duct $H^{31}$ is connected through the flexible hose $H^{33}$ to the exhauster $A^3$.

The adhesive is applied to the label N as a marginal border, shown as a stippling $N^1$ Fig. 35.

When the slide H is in rear position the label N registers centrally with the plunger $D^1$, carrying the folded box blank, and the slots $H^{26}$, $H^{27}$ register with the fingers $D^{30}$ and $D^{31}$ respectively.

The plunger $D^1$ together with the central plunger $D^{11}$ then descends and deposits the folded box blank M upon the centre of the label N.

The side fingers $D^{31}$ then raise and fold the side flaps of the label up against the sides of box blank as shown in Fig. 36, while at the same time the side clips $D^{26}$ rise up out of the way of the label and side fingers $D^{31}$.

The corner label flaps $N^3$ are then folded around the corners of the folded box blank, as shown in Fig. 9 and Fig. 37, by the rollers $D^{56}$.

These rollers are rotatably mounted on pins $D^{57}$ carried on the corner levers $D^{58}$ which are in turn pivotally mounted in the frame $D^{59}$ at $D^{60}$, Figs. 7 and 8. The levers $D^{58}$ are each provided with an arm $D^{61}$, pin connected to links $D^{62}$ which are in turn connected to the arm $D^{63}$ and spring rod $D^{64}$. Between the head of the spring rod $D^{64}$ and the arm $D^{63}$ is the compression spring $D^{65}$. This spring rod and spring are a safety device. The spring rod $D^{64}$ is slidably mounted in arm $D^{63}$ so that if arm $D^{63}$ descends, together with the tube $D^{66}$, and the rollers $D^{56}$, or levers $D^{58}$ or parts, encounter any other part which may become jammed, or out of place, the motion of rollers and levers $D^{58}$ is simply stopped; the spring $D^{65}$ compresses, rod $D^{64}$ slides up through hole in arm $D^{63}$ and no damage results. In operation the arm $D^{63}$ descends, the links $D^{62}$ are depressed, and push the lever arms $D^{61}$ outwardly, causing corner levers $D^{58}$ to swing inwardly carrying rollers $D^{56}$ past the corners of the box as shown in Figs. 9 and 37. Each corner lever $D^{58}$ carries two rollers $D^{56}$, each rotatably mounted in a forked swing arm $D^{67}$, which swing arm is pivotally mounted on lever $D^{58}$, one on each side, at $D^{68}$. A compression spring $D^{69}$ is introduced under compression between the ends of the swing arms $D^{67}$, held in place by the pins $D^{70}$. The adjusting screws $D^{71}$ may then be set so that any desired pressure within the capacity of the springs $D^{69}$, may be had between the rollers $D^{56}$ and the corner flaps of the label N folded around the corners of the box.

The above corner levers $D^{58}$ are operated by cam $D^{72}$ through the cam lever, cam rollers, and cam rod screwed into arm $D^{73}$ and held by lock nuts. The arm $D^{73}$ is fast to the upper end of telescoping tube $D^{66}$. The cam is laid out so that the rollers $D^{56}$ are moved in and roll over the corner flaps slowly, to allow time for the glued surface of the corner flaps to be thoroughly and firmly pressed against the folded box blank; while the outward motion of the rollers is several times faster.

The corner flaps having been folded around the corners of the box, and the rollers $D^{56}$ having been withdrawn, the end fingers $D^{30}$ rise through the slots $H^{24}$ and fold the end flaps of label up against the end of the box as shown in Fig. 38.

The outside of the box is now completely covered. The central plunger remains depressed and holds covered box down on the slide while the expansible plunger is withdrawn upwardly out of the box as in Fig. 39.

The portion of the label that projects above the upper edges of the box blank is next turned inwardly, and then folded down inside the box and against the inside walls of the box. This is accomplished by the side top folders $D^{74}$ and end top folders $D^{75}$, and the plunger $D^1$.

The side top folders $D^{74}$, which are pivotally mounted at $D^{76}$, swing down, and the folder $D^{77}$ pushes the projecting side edge of label inwardly over the edge of the box. The end top folders $D^{75}$, which are also pivotally mounted at $D^{78}$, swing down, and just as $D^{74}$ is being withdrawn, and before the projecting part of the label, that has been turned inwardly by $D^{74}$ can spring upwardly, folds the end projections of the label inwardly as shown in Fig. 39. At this instant the plunger $D^1$ descends, and just as $D^{75}$ is withdrawn, drives the turned in projecting edges down into the box as shown in Fig. 40.

The side top folders $D^{74}$ are operated by cam $D^{79}$ through the usual cam lever, cam roller, cam washer, and cam rod $D^{80}$ screwed into the arm $D^{81}$ that is fastened to the upper end of the telescoping tube $D^{82}$. To the lower end of this tube $D^{82}$, is attached the arm $D^{83}$, which, through the intermediary of the safety spring $D^{84}$, and safety rod $D^{85}$, links $D^{86}$ and arms $D^{87}$, is connected to the side top folders $D^{74}$.

When the cam causes the cam rod $D^{80}$ to descend the links $D^{86}$ depress, and spread apart at their lower ends, pushing the arms $D^{87}$ apart and thus causing the side top folders $D^{74}$ to swing downwardly and inwardly about the pivotal bearings at $D^{76}$.

In Fig. 39 the folders $D^{88}$ that come into contact with the label are pivotally mounted at $D^{89}$. A screw $D^{90}$, threaded through the upper folder arm and bearing against the end top folder $D^{75}$ provides means for adjustment, since the spring $D^{91}$ keeps the end of the screw $D^{90}$ pressed firmly against the end top folder $D^{75}$ so that, adjusting the screw inwardly, raises the contact edge of folder $D^{88}$ in relation to the top edge of box and adjusting it outwardly lowers it.

The end top folder $D^{75}$ is operated by cam $D^{92}$ through a train of mechanism similar to that operating $D^{74}$. That is, cam lever, cam roller, cam washer and cam rod screwed into arm $D^{93}$ fastened to the top of telescoping tube $D^{94}$. The arm $D^{95}$ is fastened to the tube $D^{94}$ and connects with the end top folder $D^{75}$ through the intermediary of the safety spring $D^{96}$, safety rod $D^{97}$, links $D^{98}$ and arms $D^{99}$.

The contact folder $D^{77}$ of side top folder is similar to $D^{88}$ of end top folder $D^{75}$.

The contact edge of the folder $D^{77}$ is approximately as long as the inside dimension of the box, and the contact folder $D^{88}$ is approximately as long as the outside width of the box.

The projecting edges of the label having been turned down inside of box by plunger $D^1$, as shown in Fig. 40, the upper part $D^2$ continues to descend, and the sides $D^3$ are forced outwardly by the flared side of $D^2$. The sides $D^3$, in turn, firmly press the turned in portion of the label against the inside of the box as shown in Fig. 41; the fingers $D^{30}$ and $D^{31}$ having in the meantime raised above the top edge of the box, presenting a firm backing for the exterior of the box and preventing its deformation.

It is to be noted that the flange $D^9$ on the inner plunger $D^2$ just slides within the fingers $D^{30}$ and $D^{31}$ and presses down on the top edges of the box to square them up to make the box uniform in height all around.

It is to be particularly noted that the sides $D^3$ of the shell, in Fig. 41, when the plunger is down, do not touch the flange $D^9$, and that there is a clearance; also that there is a clearance between the bottom of the inner plunger $D^2$ and the expansible shell $D^3$. These clearances are for safety, to avoid breakage should a double thickness of box blank get between the bottom of the plunger $D^1$ and the slide H.

In Fig. 42 the box is shown completed, the fingers $D^{30}$ and $D^{31}$ having dropped and the plunger $D^1$ raised out of the box. When the plunger $D^1$ starts to rise out of the box, the springs $D^7$, which have been compressed, immediately expand and push the shell $D^3$ off of the flared part of inner plunger $D^2$, so that the shell $D^3$, contracted, withdraws easily out of the box without disturbing the turned in edges of the label.

While the plunger $D^1$ is withdrawing, the central plunger $D^{11}$ is held against the inside bottom of the box holding it in position on the slide as shown. The central plunger then lifts and the box is ejected forwardly from the machine by the ejector $H^{34}$.

This ejector $H^{34}$ as shown in Figs. 4 and 5 is made in the form of a rectangle of wire. It is guided and held in position by slots $K^7$ in the magazine base $K^2$. The sides are bent in at $H^{35}$, and the portions $H^{36}$, striking the base $K^2$ limit the forward motion of the ejector. The spring $H^{37}$ tends to keep the ejector in forward position.

Carried on the under side of the slide H are the two levers $H^{38}$, pivotally mounted, one on either side of the slide, each with its upper end $H^{39}$ projecting upwardly through the small slots $H^{40}$ in the slide H. $H^{41}$ is a leaf spring fastened at $H^{42}$ and fitting into a slot $H^{43}$ in the end of the lever $H^{38}$. This spring resiliently maintains the cam lever $H^{38}$ in a neutral position to which it will return, if either raised or depressed and released. At each side of the slide and fastened to the guides on which the slide moves are the cams $H^{44}$, having a portion $H^{45}$ at an angle to the horizontal straight portion $H^{44}$. The pin $H^{46}$ projects from the side of the lever $H^{38}$.

When the slide H makes its rear stroke, the upper ends $H^{39}$ of levers $H^{38}$ engage the forward end of ejector $H^{34}$ and push it back. Each of the pins $H^{46}$ rides above the cam portion $H^{44}$ until it reaches the portion $H^{45}$. It rides up over this and drops into neutral position to the rear of it, still holding the ejector back against the tension of spring $H^{37}$, which has been extended as the ejector is pushed back.

When the box is finished and lies on slide H as in Fig. 42, after central plunger $D^{11}$ has been withdrawn, the slide H starts to move forward, the lever $H^{38}$ and pins $H^{46}$ being carried with it. Each of the pins $H^{46}$ engages the bent up portion $H^{45}$ of cam $H^{44}$ and is depressed by it; the upper ends $H^{39}$ being drawn down into the slots $H^4$. As soon as the ends $H^{39}$ are depressed, the ejector is released and, springing forward, strikes the rear end of the box and throws it out of the machine where it is caught in a hooded receptacle. The pins $H^{46}$ continue, depressed, along underneath the cams $H^{44}$ until they reach the forward ends, when they immediately spring up and levers $H^{38}$ resume their neutral position; the upper ends $H^{39}$ again project up through the slots $H^{40}$ and are ready to repeat their function when slide starts to rear again.

While the box blank is being brought forward from the magazine, folded up around the plunger, and the label in turn folded around and into the box, a box label is being marginally coated with glue or other adhesive, extracted from a feeder magazine, and carried to a position N over the slide as shown in Fig. 4, ready to be deposited thereon after a finished box has been ejected from the machine, and slide H has reached its forward limit.

The box label feeder J (J is used to denote the entire label feeding mechanism) as shown in various views, positions, sections etc. in Figs. 17 to 27 inclusive, consists of a yoke $J^1$ from the lower arm of which the barrel $J^2$ depends. The barrel $J^2$ is supported and guided in the bearing $J^3$, which is separate from the frame $B^3$ of the machine, and is adjustable laterally, and held to a setting by bolts $J^4$. The lower end of the barrel $J^2$ is closed by the washer $J^5$, against the bottom of which, the barrel roller $J^6$ presses.

The roller is rotatably mounted on the end of the lever $J^7$ which is carried on the shaft $J^8$ which has bearings in the frame $B^4$. The cam $J^9$ Fig. 1, through its cam lever, cam roller, cam washer and cam rod $J^{10}$ which screws into the rod end $J^{11}$ pivotally connected to the lever $J^7$, reciprocates the barrel $J^2$ and yoke $J^1$ and attached parts in accordance with the cam outline.

Projecting upwardly from the yoke $J^1$, are the two side arms $J^{13}$ which are guided by the guide arms $J^{14}$; and the two end arms $J^{15}$ which are guided by the two guide arms $J^{16}$. Also projecting vertically upwards from the yoke or platen $J^1$ are the four label guides $J^{17}$, which engage the labels N as shown in Fig. 20.

Slidably mounted on the four label guides $J^{17}$ are the screw platen $J^{18}$ and the box label platen $J^{19}$. Pinned into the screw platen $J^{18}$ is the feed screw $J^{20}$, threaded from end to end. Between the arms of the yoke $J^1$, and threaded on the screw $J^{20}$ is a ratchet $J^{21}$, which has a bearing on the top of the barrel $J^2$.

Figure 17:
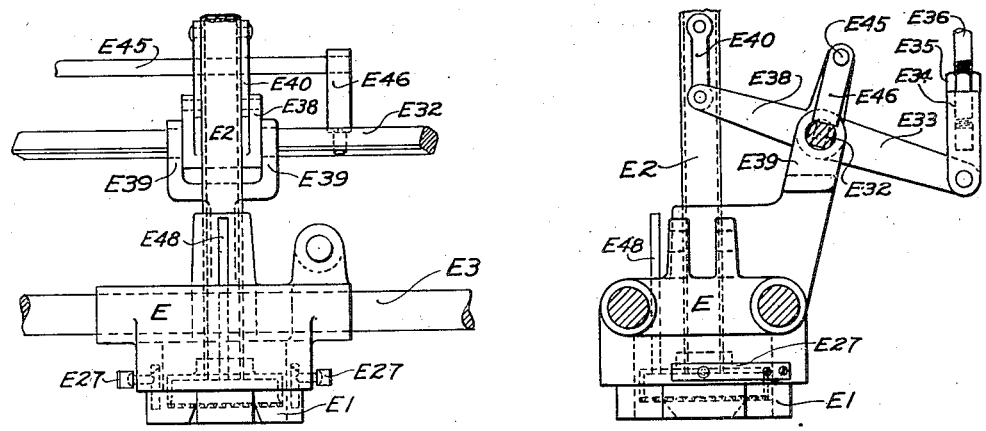
Fig. 17 is a front view of the label feeding mechanism.

The underside of the ratchet wheel $J^{21}$ is provided with teeth $J^{22}$. The pawl $J^{23}$ is pivotally mounted on the bearing $J^3$ at $J^{24}$. It has a lower arm $J^{25}$ to which the spring $J^{26}$, fastened at $J^{27}$, is attached. Projecting from the pawl $J^{24}$ there is also a lug $J^{28}$ which, as the spring pulls the arm $J^{25}$, rotates the pawl until the lug strikes the stop spring $J^{29}$ as shown in Fig. 27 which also shows the yoke $J^1$ descending, the pawl $J^2$ about to strike one of the teeth $J^{22}$. As the yoke descends the ratchet wheel tooth $J^{22}$ engages the pawl, and the ratchet wheel is rotated to the left, the space of one tooth. Fig. 17 shows the yoke $J^1$ at bottom of stroke.

The compression springs $J^{30}$ one around each label guide $J^{17}$, and resting on screw platen $J^{18}$, support the label platen $J^{19}$ resiliently, so that any labels placed on the label platen, reciprocate as a whole with the yoke $J^1$ and also move upwardly, relatively to the yoke $J^1$, as the ratchet wheel is rotated to the left. The teeth $J^{22}$ on the ratchet wheel and the number of threads on the screw are arranged so that for each reciprocation of the yoke $J^1$ the label platen moves upwardly, relatively to the yoke, a distance a little greater than the thickness of the thickest label used. A slot in the label platen at $J^{31}$ slidably engages the rib $J^{32}$ on the arm $J^{15}$ and steadies and prevents rotation of the label platen about its vertical axis relative to the side arms $J^{15}$ and $J^{13}$.

To prevent the ratchet wheel from rotating backwards as the yoke $J^1$ lifts away from the pawl $J^{23}$, the check pawl $J^{33}$, pivotally supported and held in operating position by leaf spring $J^{34}$ which is mounted at $J^{35}$, so that it can be swung to one side, allowing check pawl $J^{33}$ to drop away from ratchet wheel teeth $J^{22}$. This is necessary when the screw platen $J^{18}$, having reached its highest position, is lowered by turning the ratchet wheel to the right after pulling pawl $J^{23}$ down out of contact with the ratchet wheel teeth.

Figure 18:
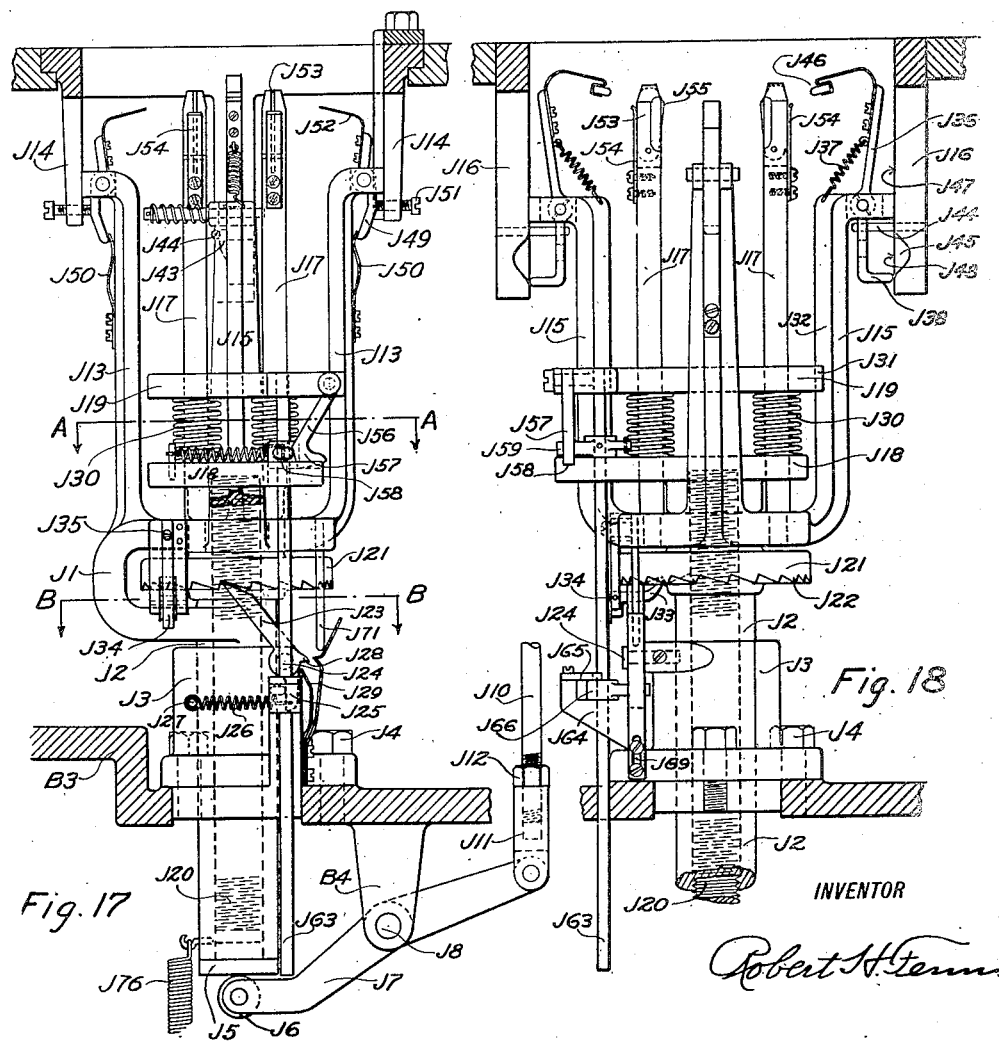
Fig. 18 is a side view of the label feeding mechanism.

Pivotally mounted on each end arm $J^{15}$ are the separator levers $J^{36}$. Each is constructed and operated as follows,—The spring $J^{37}$ keeps lever $J^{36}$ always pulled toward the arm $J^{15}$ so that the lower end $J^{38}$ always rides against the guide arm $J^{16}$. The separator lever $J^{36}$ is carried in the slot $J^{41}$ Fig. 20 and is fastened to the pin $J^{40}$ which is rotatably and slidably mounted in the portion of the arm at each side of the slot $J^{41}$. Between the head of the said pin $J^{40}$ and the side of the arm $J^{15}$ is the expanding spring $J^{42}$ which tends to keep the whole separator lever $J^{36}$ pulled over against the left side of the slot $J^{41}$. But on the side of each lever $J^{36}$ just below the slots $J^{41}$ are the small cams $J^{43}$ Fig. 17 which are shown engaged by the pins $J^{44}$ which are fastened in the guide arms $J^{16}$. In this position the lower part of the separator lever $J^{38}$ has been pushed to the right, until it dropped into the lower end of the cam groove $J^{45}$ Fig. 26. In Fig. 18 $J^{38}$ is shown just ready to drop into the cam groove as soon as the label feeder rises. When it does rise, $J^{38}$ slides down into the cam groove and the upper end of lever $J^{36}$ which carries a spring supported rubber pusher $J^{46}$, moves inwardly and downwardly, as shown in Fig. 25; until both levers acting, the pushers strike the top label of a stack carried on the label platen, and push each end of the top label toward the centre which bellies it up as shown.

As the feeder continues to rise the part $J^{38}$ slides upwardly and out of the cam groove $J^{45}$, reaching the straight surface $J^{47}$ and the pushers raise and move outwardly. As soon as $J^{38}$ is out of the cam groove, the cam lug $J^{43}$ having also moved upwardly and out of engagement with the pin $J^{44}$, the spring $J^{42}$ pulls the separator lever $J^{36}$ to the left so that when feeder descends, the lower portion $J^{38}$ of lever $J^{36}$ rides on the wall $J^{48}$, therefore the pushers $J^{46}$ do not move inwardly as the feeder descends. As it descends however, the cam lug $J^{48}$ as before explained, again contacts with the pin $J^{44}$ and the separator lever $J^{36}$ is again moved to the right and $J^{38}$ is again ready to drop into cam groove $J^{45}$ on the next upward stroke.

Pivotally mounted on the side arms $J^{13}$ are the parting levers $J^{49}$ Fig. 17 (there are two but may be more and one is similar to the other) shown in contact with the adjusting screws $J^{51}$, and held in contact by the leaf springs $J^{50}$. To the upper end of lever $J^{49}$ is attached the thin parting spring $J^{52}$.

The adjusting screws are so set that just at the instant the label pushers have bellied up the label, the lower portion of the parting lever $J^{49}$, also moving upward, slides over adjusting screw $J^{51}$ allowing parting spring $J^{52}$ to move inwardly and between the top label, which has been bellied up, and the stack of labels below, as shown in Fig. 19. It remains in this position until the feeder descends and the lever $J^{49}$ again striking the adjusting screw $J^{51}$, moves inwardly, while the parting spring $J^{52}$ moves outwardly ready for the next upward stroke. The function of the parting springs is to prevent any of the lower labels from being extracted from the feeder when the topmost label is being withdrawn.

Each upper end of the guide arms $J^{17}$ is slotted and a flat label holder $J^{53}$ is pivotally mounted in the slot so that it presents a narrow edge toward the label and is held pressed toward them by the leaf spring $J^{54}$. The upper part of $J^{53}$ is bevelled upwardly and outwardly and the lower portion downwardly and inwardly. The upper portion is so made as to provide clearance for the marginal die $E^1$ when the feeder is at the top of stroke as in Fig. 19. The lower portion is so made that the labels which fit loosely between the guide arms $J^{17}$ when being pushed upwardly by the label platen will centre themselves exactly, and also be held below the points $J^{55}$, above which point the labels are never fed, so that they do not fly off when the feeder reciprocates.

Pivotally mounted on the label platen $J^{19}$ Fig. 17 is the pressure link $J^{56}$, whose foot $J^{57}$ slidably fits into a slot $J^{58}$ in the screw platen $J^{18}$. When the feeder raises with a stack of labels as in Fig. 19 and the labels come in contact with the marginal die $E^1$ the springs $J^{30}$ compress, and the foot of pressure link $J^{57}$ slides to the left in slot $J^{58}$.

Referring to Fig. 21 the foot $J^{58}$ is shown in starting position, in contact with arm $J^{59}$ of upper collar $J^{60}$, the spring $J^{61}$ acting through arm $J^{62}$ maintaining the arm $J^{59}$ always in contact with foot $J^{58}$. The upper collar $J^{60}$ is mounted and pinned fast to the vertical square rod $J^{63}$ which extends downwardly from the label platen, through the screw platen and through a bearing $J^{64}$ in the barrel bearing $J^3$. Just above the bearing $J^{64}$ and resting on it and held down by the clip $J^{65}$ is the lower collar $J^{66}$ provided with a square hole, approximately the same size as the square rod $J^{63}$ which slidably passes through it. Therefore when the upper collar $J^{60}$ rotates to the left as link $J^{57}$ pushes it, when springs $J^{30}$ are compressed, as the feeder rises to the top of its stroke, the rod $J^{63}$ also rotates lower collar $J^{66}$ to the left. On lower collar $J^{60}$ is an arm $J^{67}$ Figs. 23 and 24 against which the lower arm of pawl $J^{23}$ is held in contact by the spring $J^{26}$.

Figs. 23 and 27 show the position of $J^{67}$ and pawl $J^{23}$ before the feeder rises. Figs. 24 and 19 show their positions when the feeder has reached the top of its stroke and springs $J^{30}$ have been compressed. The arm $J^{67}$ has pushed the lower arm $J^{25}$ of pawl $J^{23}$ to the right, and the pawl $J^{23}$ is thereby swung downwardly to the left. The leaf spring $J^{68}$, made so as to be adjustable up or down by means of the slot $J^{69}$ and provided with the nose $J^{70}$, is shown in Fig. 19 in position so that the nose $J^{70}$ is in contact with, and under, the lug $J^{28}$ of pawl $J^{23}$, thereby holding the pawl $J^{23}$ down so that when the feeder descends the pawl will not come in contact with the teeth $J^{22}$ of the ratchet wheel $J^{21}$. The ratchet wheel therefore will not be rotated, and the screw and label platen will not be fed upwardly.

In order to release the spring $J^{68}$ the release pin $J^{71}$ Fig. 19 is provided. When the feeder descends, this release pin strikes the upper part of the spring $J^{68}$ and pushes it away from the pawl lug $J^{28}$ as shown in Fig. 17. The pawl, released, is immediately pulled to normal position by the spring $J^{26}$, the label platen having in the meantime raised as the springs $J^{30}$ again expanded, allowing the square rod $J^{63}$ to rotate back to its normal position.

In operation, the stroke of the feeder is so arranged that with the labels on the label platen, and the feeder J at the top of its stroke, the pressure of labels against marginal die $E^1$ is sufficient to compress the springs $J^{30}$ just enough so that the pawl $J^{23}$, actuated by the square rod $J^{63}$ and attached parts as above described, is depressed similar to the position shown in Fig. 19 but just a little higher so that the nose $J^{70}$ of leaf spring $J^{68}$ does not catch under lug $J^{28}$.

This is the normal condition when labels are just at the right height. But since at each upward stroke of the feeder a label is removed from the top of the pile of labels, and for each stroke of the feeder the pile is fed upwardly a distance greater than the thickness of the label, it is evident, that after a number of strokes the labels would be too high and some would fall from between the guide arms $J^{17}$. However this cannot happen because as soon as the labels are fed up a little higher than normal position, the springs $J^{30}$ are compressed a little more than normal and consequently, the pawl $J^{23}$, through the mechanism intervening between the label platen and said pawl, is depressed until the nose $J^{70}$, does catch under the lug $J^{28}$ of the pawl and holds it depressed so that when the feeder descends, the pawl, not engaging the ratchet wheel teeth, the screw and label platens are fed no higher for that stroke. By the above means the labels are always maintained at the correct operative height and the pressure requisite for the attainment of the imprint of the adhesive from the marginal die is maintained practically a constant.

An adjustment is also provided to rotate the feeder slightly about its vertical axis so as to slightly change the position of the label N relative to the marginal die $E^1$. The object of this is to change the position of the label on the feed slide, since the carriage and suction plunger maintain the label in the same position as it is occupied in the feeder when it deposits it on the feed slide, in order to make the sides of the label parallel with the sides of the box blank folded around the expansible plunger $D^1$. This is accomplished by the bar $J^{72}$ Figs. 20 and 25 held in place by the screws $J^{73}$. Depending from this bar is the rod $J^{74}$ over which the slot $J^{75}$ in arm $J^{13}$ slides. The feeder is rotated by moving the bar $J^{72}$ as required, forward or back.

At G Figs. 1, 2 and 3 is shown a device for applying adhesive which may be a glue or paste, etc. It consists essentially of a glue receptacle $G^1$ Figs. 10, 11, 12 and 13 provided with a water bath $G^2$ in the outer receptacle $G^3$. $G^{13}$ is a source of heat. Partly immersed in the glue is the glue roller $G^4$ supported on the drive shaft $G^5$ carried in the bearings $G^6$, open at the top so the roller and attached mechanism can be easily lifted out of the glue tank for cleaning. The shaft $G^5$ is fast in the roller $G^4$. A sprocket $G^7$ driven from sprocket $G^9$ by chain $G^8$ rotates the glue roller. The sprocket $G^9$ and its shaft are driven by pulley $G^{10}$ and belt $G^{11}$ from a pulley $G^{12}$ on the machine drive shaft $C^2$.

Figure 13:
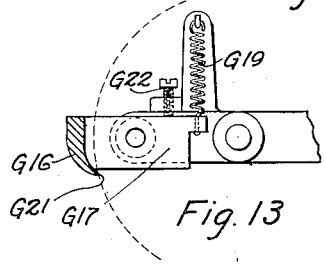
Fig. 13 is an enlarged view showing scraper of adhesive mechanism.

The arms $G^{14}$ are removably attached to the tank $G^1$ at $G^{15}$ and are also supported by the shaft $G^5$ which passes through them. A glue scraper $G^{16}$, shown enlarged in Fig. 13, provided with side scrapers $G^{17}$ through which the shafts $G^{18}$ pass, is thereby pivotally mounted, so that the spring $G^{19}$ arranged to pull upwardly on the arm $G^{20}$ of the scraper, pulls the scraper edge $G^{21}$ downwardly against the face of the glue wheel $G^4$. The shafts $G^{18}$ are fast in the arms $G^{14}$.

The glue wheel revolves in the direction of the arrow and the glue which adheres to its surface is scraped off the face and sides by the scraper $G^{16}$ and its sides $G^{17}$. The screws $G^{22}$ provide means for regulating the space between the scraper edge $G^{21}$ and the face of the glue roller, thereby also regulating the thickness of the glue layer on the surface of the roller after it passes the scraper.

Pivotally mounted on shaft $G^{23}$, carried in bearings $B^5$ in the frame $B^1$, are the arms $G^{24}$ carrying the feed roller $G^{25}$. The feed roller is carried on a shaft $G^{26}$ provided with slotted bearings in the arms $G^{24}$ so that it can easily be lifted out for cleaning.

The cam $G^{27}$ Fig. 1 through its cam lever, cam roller, cam washer, and cam rod $G^{28}$, which is screwed into rod end $G^{29}$ and locked by nut $G^{30}$, and the lever $G^{31}$ on the end of shaft $G^{23}$ operate the feed roller $G^{25}$. The roller is shown in full lines in its highest position, running against the under side of the marginal die $E^1$. As the die passes over the feed roller a coating of glue is applied to the under face of said die. The stop $G^{32}$, adjusted by screw $G^{33}$ and engaging the top of lock nut $G^{30}$ determines the limit of upward motion of the feed roller $G^{25}$.

Figure 10:
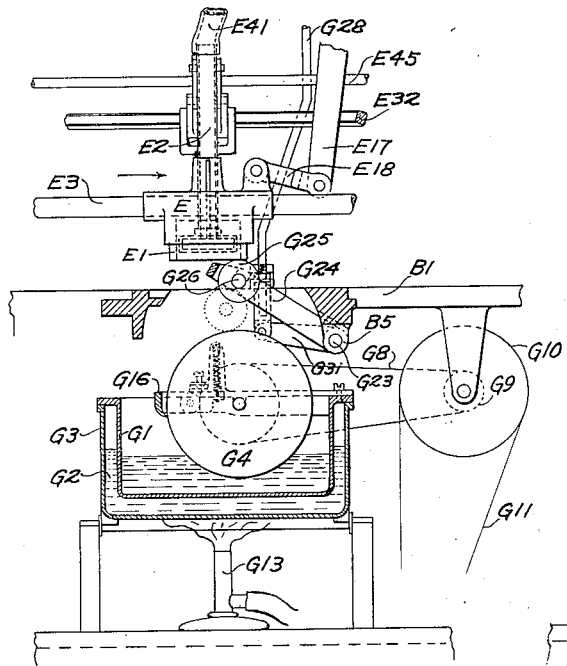
Fig. 10 is a front view, in partial section, of the adhesive applying mechanism.
Figure 11:
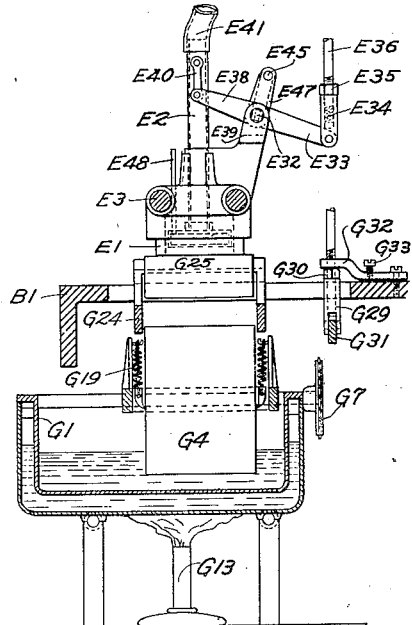
Fig. 11 is a side view, in partial section, of the adhesive applying mechanism.
Figure 12:
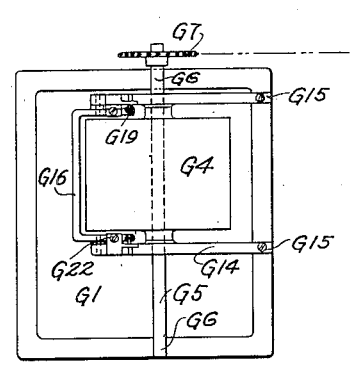
Fig. 12 is a plan view of the adhesive applying mechanism.

After the marginal die passes, the roller $G^{24}$ is depressed and runs against the glue coated face of the glue roller $G^4$ from which it in turn is again coated with glue and is then ready to be raised and to coat the marginal die on its next passage to the right. The dotted lines Fig. 10 show the feed roller running in contact with the glue coated face of the glue roller $G^4$.

At E Figs. 1 and 2 is shown the carriage with its marginal die $E^1$ and suction plunger $E^2$. It appears in detail in Figs. 4, 10, 11, 14, 15, 16, 17, 18, 19, 47 and 48. It slides on the two horizontal rods $E^3$ carried in the frame $A^1$ at $A^{10}$. The cam $E^4$ Fig. 1 operates the carriage causing it to travel from over the feeder J to the left of the machine over the slide H and back again.

Figure 47:
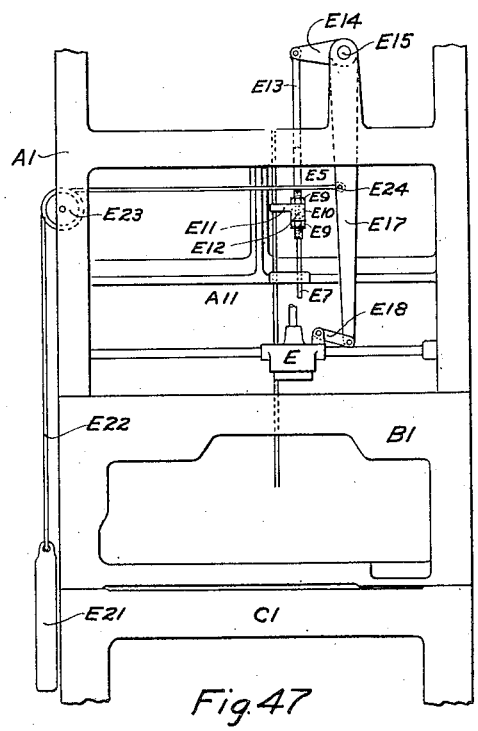
Fig. 47 is a front view of the cam $B^4$ and intervening mechanism operating the carriage E.
Figure 48:
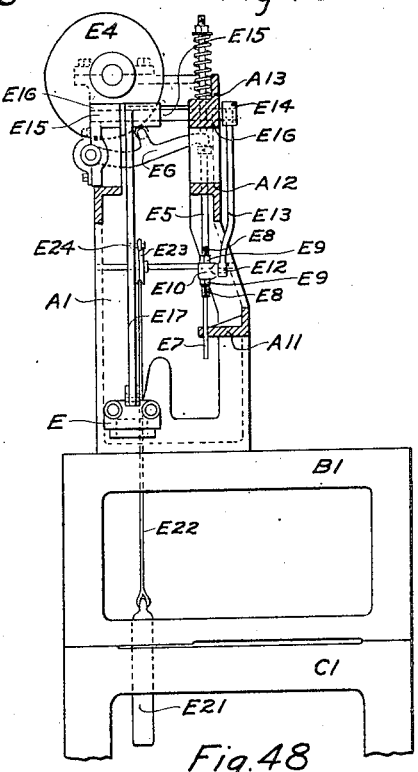
Fig. 48 is a side view of Fig. 47.

The cam rod $E^5$ Figs. 47 and 48 in this case is reciprocated like the others, by the cam lever $E^6$. The lower end passes through a bearing $A^{11}$, and the upper end through bearings $A^{12}$ and $A^{13}$. The lower part of the cam rod is threaded at $E^8$, and held between the two lock nuts $E^9$ is the nut $E^{10}$ which is bored to fit the tops of the threads. It is provided with an arm $E^{11}$ through which the cam rod $H^4$ passes; this arm prevents the nut $E^{10}$ from rotating about the cam rod $E^5$. A pin $E^{12}$ projects from the back of $E^{10}$, and passes through one end of link $E^{13}$. The other end of the link is pivotally attached to the lever arm $E^{14}$ which is keyed to shaft $E^{15}$ carried in the bearings $E^{16}$. On the front end of shaft $E^{15}$ is keyed the long depending lever $E^{17}$ which is pivotally connected to the carriage E by the link $E^{18}$.

In operation, when the cam $E^4$ depresses the cam rod $E^5$ it, through the mechanism described, depresses the end of lever $E^{14}$ which oscillates shaft $E^{15}$, and causes lever $E^{17}$ to pull carriage E to the right, while when the cam allows the cam rod to rise, the action is reversed, and the lever $E^{17}$ pushes carriage E to the left. An adjustable stop $E^{19}$ Fig. 3 limits the motion of the carriage to the right and an adjustable stop $E^{20}$ limits its motion to the left.

A weight $E^{21}$ suspended on a rope $E^{22}$, which passes over a pulley $E^{23}$ carried on a shaft supported in the frame $A^1$, and fastened to the middle of the arm $E^{17}$ at $E^{24}$, aids in moving the carriage E to the left.

Figure 16:
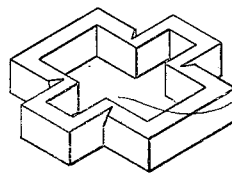
Fig. 16 is a perspective view of the die.

The marginal die $E^1$ is shown in Fig. 16, impression side up. Fig. 35 $N^1$ shows how the glue is applied in a strip adjacent to the marginal edges of the box label.

Figure 14:
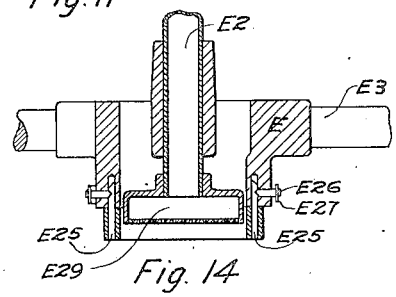
Fig. 14 is a front view, in section, of the die carrier and suction plunger.
Figure 15:
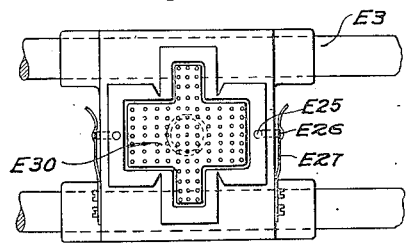
Fig. 15 is a face view of the under side of said carrier, die and plunger.

The die is removably fastened to the bottom of the carriage by means of the two pins $E^{25}$ Figs. 14 and 15, which are fast in the die and provided at their upper ends with notches into which the spring pins $E^{26}$ are pressed by the leaf springs $E^{27}$ to which they are riveted. To attach the die the pins are entered in the holes in the carriage and pushed upwardly, the pins being bevelled on the top slide by the spring pins $E^{26}$ which snap into the notches and firmly hold the die in position. To release the die the leaf springs $E^{26}$ are spread outwardly, the spring pins pull out of the notches in die pins and the die drops down from the carriage.

A central vertical bearing is provided on carriage E through which the suction plunger $E^2$, reciprocates vertically. At the lower end it is provided with a hollow head $E^{29}$ communicating with the tube $E^2$. The head is provided with a face $E^{30}$ shown in Fig. 15, through which small holes, larger at their inner end are bored, making a suction plate. The suction plunger head approximates the shape of the opening $E^{31}$ through the marginal die but is smaller to provide working clearance so that the suction plunger head can reciprocate vertically through the marginal die.

Parallel to the carriage guide rods $E^3$ is the square rock rod $E^{32}$ mounted in a bearing at each end in the frame $A^1$ at $A^{14}$. Fastened on the left hand end of rock rod $E^{32}$ is the arm $E^{33}$ pivotally attached to the rod end $E^{34}$ into which the cam rod $E^{36}$ is screwed and locked in place by the lock nut $E^{35}$.

The cam E through its cam lever, cam roller, cam washer and cam rod $E^{36}$, oscillates the arm $E^{33}$ and rock rod $E^{32}$ as required and determined by the cam outline.

The rock rod lever $E^{38}$ is provided with a square hole and slidably fits the rock rod $E^{32}$. It is positioned between the two arms $E^{39}$ in which the rock rod $E^{32}$ also has bearings. As the rock rod $E^{32}$ oscillates the rock rod lever $E^{38}$ through the plunger links $E^{40}$ vertically reciprocates the suction plunger $E^2$. The auxiliary rock rod $E^{45}$ which is fixed in the two arms $E^{46}$ which are in turn fastened to the rock rod $E^{32}$, slidably passes through an extension arm fastened to the lever $E^{38}$. The function of this auxiliary rod is to aid the rock rod in oscillating the arm $E^{38}$, being farther from the center of the rock rod, than the square sides of the rod, it reduces the friction of the lever $E^{38}$ on the square rod as it slides along it, impelled by the arms $E^{39}$ as the carriage E moves to right or left.

A flexible hose $E^{41}$, Figs. 1 and 2, 10 and 11, connects the plunger $E^2$ with the plunger valve $E^{42}$ Figs. 1 and 2. This valve is connected by pipe to the exhauster $A^3$ and is operated by cam $E^{43}$ through its cam lever, cam roller, cam washer and cam rod $E^{44}$ which is fastened to the plunger of the valve which opens the exhaust when it raises and closes the valve when it descends.

In operation, assuming the carriage E to be moving toward the right from the feed slide H, the suction plunger $E^2$ is raised up within the marginal die $E^1$. The die $E^1$ passes over and comes into rolling contact with the feed roller $G^{25}$ and is coated with glue. The carriage continues moving to the right until it strikes stop $E^{19}$ when it is directly over feeder J. The feeder has in the meantime been rising, the top label is separated from the lower ones and as the feeder reaches top of its stroke the top label is pressed against the under side of marginal die $E^1$. Then suction plunger $E^2$ descends and the plunger head $E^{29}$ rests upon the top label and continues down in contact with it as the feeder descends. Just as the plunger head $E^{29}$ contacts with the top label the valve $E^{42}$ opens and air suction acting through the holes in the face $E^{30}$ of plunger, sucks the label tightly against it. Therefore when the suction plunger stops its descent a short distance above the table $B^1$ the top label is held fast to it while the feeder with the balance of the labels descends to bottom of stroke. The carriage E then moves to the left. The feed roller $G^{25}$ has in the meanwhile been depressed, and running in contact with the glue roller $G^4$ obtains another coating of glue. When the carriage with the glued label reaches the stop $E^{20}$ it is ready to deposit the label on the slide H. In Fig. 4 at N the glued label is shown held by suction to the under face $E^{30}$ of the suction plunger, which has descended and is just about to deposit it on the slide H.

When the suction plunger does drop and deposit the label the suction valve $E^{42}$ closes, the label is released from the suction plunger and the suction through the holes $N^{30}$ holds the label firmly on the slide. The carriage and suction plunger are then ready for another movement to the right to repeat the cycle.

The automatic box machine is driven by a belt running on pulley $C^3$ which also has a portion of its flat face, and from this flat face, by means of a belt, drives the exhauster $A^3$.

At L is an ordinary cone clutch operated by the hand lever $L^1$ through the link $L^2$, the rock lever $L^3$ and clutch ring $L^4$. $C^4$ are the bearings for shaft $C^2$, and $C^5$ are thrust collars running against the ends of bearings $C^4$.

Depressing the hand lever $L^1$ throws the clutch pulley $L^5$, which runs loose on shaft $C^2$, into contact with clutch cone $L^6$. This revolves it, and by means of a belt $L^7$ it drives the cam shaft pulley $A^{15}$.

What I claim is:—

1. In an automatic box machine the combination of a horizontally reciprocated feed slide together with a plurality of telescoping, vertically reciprocated tubes, operating independently of each other, one of said tubes provided with a plunger adapted to press a blank against said slide.

2. In an automatic box machine the combination of a horizontally reciprocated feed slide together with a plurality of telescoping, vertically reciprocated tubes, operating independently of each other, one of said tubes provided with a rectangular plunger adapted to press a blank against said slide.

3. In an automatic box machine, the combination of a plunger and a shell provided with yielding sides adapted to fit over said plunger together with a central plunger adapted to operate through said plunger and said shell.

4. In an automatic box machine, the combination of a plunger, a shell provided with yielding sides adapted to fit over said plunger and means adapted to prevent said shell from slipping off said plunger together with a central plunger adapted to operate through said plunger and said shell.

5. In an automatic box machine, the combination of a plunger, a shell provided with yielding sides adapted to fit over said plunger, and pins in the sides of said plunger extending through slots in said shell together with a central plunger adapted to operate through said plunger and said shell.

6. In an automatic box machine, the combination of a plunger, a shell provided with yielding sides adapted to fit over said plunger, pins in the sides of said plunger extending through slots in said shell and means between said plunger and said shell adapted to yieldingly press said shell so that said pins engage ends of said slots together with a central plunger adapted to operate through said plunger and said shell.

7. In an automatic box machine, the combination of a plunger, a shell provided with yielding sides, the upper portion of said plunger provided with faces inclined to the faces of the lower portion of said plunger and adapted to press said yielding sides outwardly when the upper portion of said plunger enters said shell.

8. In an automatic box machine, the combination of a plunger a shell adapted to fit over said plunger and provided with yielding sides, the upper portion of said plunger provided with faces inclined to the faces of the lower portion of said plunger, pins projecting from the sides of said plunger and extending into slots in the said yielding sides, together with means between said shell and said plunger adapted to yieldingly press said shell away from the bottom of said plunger.

9. In an automatic box machine, the combination of a plunger provided with vertical through holes, a shell adapted to fit over said plunger and provided with yielding sides, the upper portion of said plunger provided with faces inclined to the faces of the lower portion of said plunger; pins projecting from the sides of said plunger and extending into slots in the said yielding sides, together with means between said shell and said plunger adapted to yieldingly press said shell away from the bottom of said plunger.

10. In an automatic box machine, the combination of a plunger provided with vertical through holes, a shell adapted to fit over said plunger and provided with yielding sides; the upper portion of said plunger made in the form of an inverted frustum of a pyramid; pins projecting from the sides of said plunger and extending into slots in the said yielding sides, together with spring means between said shell and said plunger adapted to press said shell, yieldingly, away from the bottom of said plunger.

11. In an automatic box machine, the combination of a plunger provided with vertical through holes, a shell adapted to fit over said plunger and provided with yielding sides; the upper portion of said plunger made in the form of an inverted frustum of a pyramid, with a projecting lip from its upper edge; pins projecting from the sides of said plunger and extending into slots in the said yielding sides, together with spring means between said shell and said plunger adapted to press said shell, yieldingly, away from the bottom of said plunger.

12. In an automatic box machine the combination of a plurality of telescoping, vertically reciprocated tubes operating independently of each other one of said tubes provided at its lower end with a plunger provided with vertical through holes, a shell adapted to fit over said plunger and provided with yielding sides; the upper portion of said plunger, provided with faces inclined to the faces of the lower portion of said plunger and with a projecting lip from its upper edge; pins projecting from the sides of said plunger and extending into slots in the said yielding sides; spring means between said shell and said plunger adapted to press said shell, yieldingly, away from the bottom of said plunger together with a horizontally reciprocated feed slide.

13. In an automatic box machine the combination of a plurality of telescoping, vertically reciprocated tubes operating independently of each other, one of said tubes provided at its lower end with an expansible plunger comprising a head provided with through holes; a shell, provided with yielding sides, adapted to fit over said head, the upper portion of said head made with sides inclined to its sides of the lower portion, and with a lip projecting from its upper edge; pins projecting from the sides of said head and extending into slots in the said yielding sides, together with means to press said shell, yieldingly, away from the bottom of said plunger, together with a central plunger operating through said plunger tube and said shell.

14. In an automatic box machine the combination of a plurality of telescoping, vertically reciprocated tubes operating independently of each other, one of said tubes provided at its lower end with an expansible plunger comprising a head provided with through holes; a shell, provided with yielding sides, adapted to fit over said head, the upper portion of said head made with sides inclined to its sides of the lower portion, and with a lip projecting from its upper edge; pins projecting from the sides of said head and extending into slots in the said yielding sides, and means to press said shell, yieldingly, away from the bottom of said plunger; a central plunger operating through said plunger and said shell together with a horizontally reciprocating feed slide against which said plunger is adapted to press a blank.

15. In an automatic box machine the combination of a plurality of telescoping, vertically reciprocated tubes operating independently of each other, one of said tubes provided at its lower end with an expansible plunger comprising a head provided with through holes; a shell, provided with yielding sides, adapted to fit over said head, the upper portion of said head made with sides inclined to its sides of the lower portion, and with a lip projecting from its upper edge; pins projecting from the sides of said head and extending into slots in the said yielding sides, and means to press said shell, yieldingly, away from the bottom of said plunger, together with a central plunger, provided with an extended foot, operating through said plunger tube.

16. In an automatic box machine the combination of an expansible plunger comprising a head, a shell adapted to fit over said head, means integral with said head adapted to press the sides of said shell outwardly when said head is forced into said shell, together with a plunger operating through said head and said shell.

17. In an automatic box machine the combination of an expansible plunger comprising a head, a shell adapted to fit over said head, means integral with said head adapted to press the sides of said shell outwardly when said head is forced into said shell, together with a plunger, provided with an extended foot, operating through said head and said shell.

18. In an automatic box machine the combination of a plurality of telescoping, vertically reciprocated tubes operating independently of each other, one of said tubes provided at its lower end with an expansible plunger comprising a head, a shell adapted to fit over said head, means integral with said head adapted to press the sides of said shell outwardly when said head is forced into said shell; a central plunger provided with an extended foot operating through said expansible plunger, together with a horizontally reciprocating feed slide, against which said central plunger is adapted to press a blank.

19. In an automatic box machine the combination of a plurality of telescoping, vertically reciprocated tubes operating independently of each other, with means for causing such reciprocation at such intervals and of such stroke as required, one of said tubes provided at its lower end with an expansible plunger comprising a head, a shell adapted to fit over said head, means integral with said head adapted to press the sides of said shell outwardly when said head is forced into said shell; a central plunger provided with an extended foot operating through said expansible plunger, together with a horizontally reciprocating feed slide, against which said central plunger is adapted to press a blank.

20. In an automatic box machine the combination of a horizontally reciprocated feed slide provided with suction means to hold a box label in position on said slide, together with a reciprocated plunger adapted to press a blank against said slide, said plunger provided with a yieldable lower face.

21. In an automatic box machine the combination of a horizontally reciprocated feed slide provided in its upper face with a recess adapted to receive a box blank, and a recess provided with suction means under a portion of its area adapted to hold a box label in said recess, together with a plunger, provided with a yieldable lower face adapted to press a box blank against the bottom of the above first mentioned recess and a box blank and a box label against the bottom of the other recess.

22. In an automatic box machine the combination of a horizontally reciprocated feed slide provided in its upper face with a recess adapted to receive a box blank, a portion of said recess provided with suction means to hold said box blank in said recess, and a recess adapted to receive a box label, a portion of said latter recess provided with suction means to hold said box label in said recess, together with a vertically reciprocated plunger, provided with a lower yieldable face, adapted to press a box blank or a box blank and a box label against said slide.

23. In an automatic box machine the combination of a horizontally reciprocated feed slide provided in its upper face with a recess, adapted to receive a box blank, another portion of said upper face provided with suction means to hold a box label in position on said slide, together with a vertically reciprocated plunger, provided with a yieldable lower face adapted to press either a box blank or a box blank and a box label against said slide.

24. In an automatic box machine the combination of a horizontally reciprocated feed slide provided in its upper surface with a recess adapted to receive a box blank, and a rib at each side of said recess adapted to engage the edges of said box blank together with a vertically reciprocated plunger, provided with a yieldable lower face adapted to press said box blank against said slide.

25. In an automatic box machine the combination of a horizontally reciprocated feed slide provided in its upper surface with a recess adapted to receive a box blank, a rib at each side of said recess adapted to engage the edges of said box blank, and another portion of said slide provided with suction means adapted to hold a box label in position on said slide together with a vertically reciprocated plunger, provided with a yieldable lower face, adapted to press either a box blank or a box blank and a box label against said slide.

26. In an automatic box machine the combination of a horizontally reciprocated feed slide provided in its upper surface with a recess adapted to receive a box blank, a rib at each side of said recess adapted to engage the edges of said box blank, and pins projecting from the bottom of said recess adapted to engage the rearward edges of said box blank together with a vertically reciprocated plunger, provided with a yieldable lower face, adapted to press a box blank against said slide.

27. In an automatic box machine the combination of a horizontally reciprocated feed slide provided in its upper surface with a recess adapted to receive a box blank, a rib at each side of said recess adapted to engage the edges of said box blank and pins projecting from the bottom of said recess adapted to engage the rearward edges of said box blank, and suction means below another portion of said slide adapted to hold a box label in position on said slide together with a vertically reciprocated plunger, provided with a lower yieldable face, adapted to press either a box blank or a box blank and a box label against said slide.

28. In an automatic box machine a horizontally reciprocated feed slide provided in its upper surface with a recess adapted to receive a box blank, a rib at each side of said recess adapted to engage the edges of said box blank and pins projecting from the bottom of said recess adapted to engage the rearward edges of said box blank and with suction means beneath another portion of said slide adapted to hold a box label in position on said slide together with two telescoping plungers adapted to press a box blank against said slide.

29. In an automatic box machine the combination of a horizontally reciprocated feed slide, provided with a recess and rectangular slots enclosing a rectangular portion of said slide in the bottom of said recess, together with vertically reciprocated, independently operating, telescoping tubes below the plane of said slide, two of said tubes, each provided with fingers at its upper end adapted to pass through said slots in said slide as said tubes are reciprocated, and a central guide for said tubes provided at its upper end with a rectangular guide for said fingers, said rectangular guide being of approximately the same dimensions as the portion of said slide included between the rectangular slots in said slide, also of the lateral external dimensions of the box to be covered and furthermore adapted to support the portions of said feed slide, included between the slots in said slide, both in its forward and rear positions.

30. In an automatic box machine the combination of a horizontally reciprocated feed slide, provided with a recess and slots enclosing a portion of said slide in the bottom of said recess, together with vertically reciprocated, independently operating, telescoping tubes, below the plane of said slide, two of said tubes, each provided with fingers at its upper end, adapted to pass through said slots in said slide, as said tubes are reciprocated, and a central guide, for said tubes, provided at its upper end with a guide for said fingers, said central guide adapted to support the portions of said feed slide, included between the slots in said slide, both in its forward and rear positions.

31. In an automatic box machine the combination of a horizontally reciprocated feed slide, provided with a recess and two sets of slots, each enclosing a rectangular portion of said slide, together with vertically reciprocated, independently operating, telescoping tubes below the plane of said slide, said tubes each provided with fingers adapted to pass through said slots in said slide and a central guide for said tubes and fingers, said central guide adapted to support the portions of said feed slide, included between the slots in said slide, both in its forward and rear positions.

32. In an automatic box machine a horizontally reciprocated feed slide, as described, a plurality of vertically reciprocated independently operating, telescoping tubes above the plane of said slide and a plurality of vertically reciprocated independently operating telescoping tubes below the plane of said slide, said last named tubes provided with fingers adapted to pass through slots in said slide, and a central guide for said tubes and fingers, said central guide adapted to support the portions of said feed slide, included between the slots in said slide, both in its forward and rear positions.

33. In an automatic box machine a horizontally reciprocated feed slide, as described, a plurality of vertically reciprocated independently operating, telescoping tubes above the plane of said slide, one of them provided with an expansible plunger, as described, and a plurality of vertically reciprocated, independently operating, telescoping tubes below the plane of said slide, said last named tubes provided with fingers adapted to pass through slots in said slide and a central guide for said tubes and fingers, said central guide adapted to support the portions of said feed slide, included between the slots in said slide, both in its forward and rear positions.

34. In an automatic box machine a horizontally reciprocated feed slide, as described, a plurality of vertically reciprocated, independently operating, telescoping tubes above the plane of said slide, one of them provided with an expansible plunger, as described, together with a central plunger and a plurality of vertically reciprocated, independently operating telescoping tubes below the plane of said slide, said last named tubes provided with fingers adapted to pass through slots in said slide, and a central guide for said tubes and fingers, said central guide adapted to support the portions of said feed slide, included between the slots in said slide, both in its forward and rear positions.

35. In an automatic box machine the combination of a horizontally reciprocated feed slide together with an ejector comprising a wire frame, guides therefor, a spring at one end attached to said frame, the other end of said spring fixed; a cam actuated trigger projecting through the upper face of said slide, adapted to engage and push said wire frame back against spring tension, when the slide returns, and to release the wire frame on forward motion of said slide, and supporting ways for said slide.

36. In an automatic box machine the combination of a horizontally reciprocated feed slide together with an ejector comprising a wire frame, guides therefor, spring means attached to said ejector to cause it to spring forward after being pushed back, when slide returns, and released as said slide starts forward, by pivoted spring positioned triggers carried by and projecting up through said slide, a pin on said trigger adapted for engagement with a fixed cam as said slide reciprocates.

37. In an automatic box machine the combination of a horizontally reciprocated feed slide with an ejector of the type described, a plurality of telescoping, vertically reciprocated tubes operating independently of each other, one of said tubes provided at its lower end with an expansible plunger of the type described; a central plunger provided with an extended foot operating through said expansible plunger, said central plunger adapted to press a box blank against said slide.

38. In an automatic box machine the combination of a horizontally reciprocated feed slide provided in its upper surface with a recess adapted to receive a box blank, a portion of said recess provided with suction means to hold said box blank in said recess, and another recess adapted to receive a box label, a portion of said latter recess provided with suction means to hold said box label in said recess, an ejector of the type described and a plurality of telescoping, vertically reciprocated tubes, operating independently of each other, one of said tubes provided with a plunger adapted to press a box blank, or a box blank and a box label, against said slide.

39. In an automatic box machine the combination of a horizontally reciprocated feed slide, provided in its upper surface with a recess adapted to receive a box blank, a rib at each side of said recess adapted to engage the edges of said box blank, ribs projecting from the bottom of said recess adapted to engage the rearward edges of said box blank and suction means below another portion of said slide adapted to hold a box label in position on said slide, and an ejector of the type described adapted to eject a folded box blank, together with two of a number of telescoping, vertically reciprocated, independently operated tubes, said two tubes provided with telescoping plungers adapted to press a box blank or a box blank and a box label against said slide.

40. In an automatic box machine the combination of a reciprocated slide, provided with openings, a reciprocable plunger above said slide, fingers operating through said openings to constitute a form about said plunger.

41. In an automatic box machine the combination of a reciprocable slide provided with openings, a reciprocable plunger above said slide; fingers operating through said openings to constitute a form about said plunger; said plunger provided with expanding means adapted to reduce the distance from the inner faces of said fingers to the respective sides of said plunger.

42. In an automatic box machine the combination of a horizontally reciprocated feed slide provided with a recess adapted to receive a box blank and a magazine adapted to feed a box blank, by gravity, into said recess in said reciprocated slide, together with two telescoping, vertically reciprocated, independently operated plungers adapted to press a box blank against said slide.

43. In an automatic box machine the combination of a horizontally reciprocated feed slide provided with a recess adapted to receive a box blank, and a magazine provided with a lower opening through its base approximating the size and shape of a box blank, the walls of said opening provided with vertical ribs; said magazine adapted to feed, by gravity, a box blank into said recess of said slide at each reciprocation thereof, together with two telescoping, vertically reciprocated, independently operated plungers adapted to press a box blank against said slide.

44. In an automatic box machine the combination of a horizontally reciprocated feed slide provided with a recess adapted to receive a box blank, and a magazine provided with a lower opening through its base approximating the size and shape of a box blank, the walls of said opening provided with vertical ribs, the lower front edges of said opening through which the side flaps of said box blank descend, bevelled upwardly toward the rear; said magazine adapted to feed singly, by gravity, box blanks into said recess of said slide at each reciprocation thereof, together with two telescoping, vertically reciprocated, independently operated plungers adapted to press a box blank against said slide.

45. In an automatic box machine the combination of a horizontally reciprocated feed slide provided with a recess adapted to receive a box blank, and a magazine, provided with a lower opening through its base approximating the size and shape of a box blank, the walls of said opening provided with vertical ribs, the lower front edges of said opening through which the side flaps of said blanks descend, bevelled upwardly toward the rear, the base of said magazine adjustable, so that its lower forward edges can be positioned, in relation to said feed slide to allow only one box blank to be extracted from the magazine by each forward motion of said feed slide, together with two telescoping, vertically reciprocated, independently operated plungers adapted to press a box blank against said slide.

46. In an automatic box machine the combination of a horizontally reciprocated feed slide provided with a recess adapted to receive a box blank, and a magazine, provided with a lower opening through its base approximating the size and shape of a box blank, the walls of said opening provided with vertical ribs, the lower front edges of said opening, through which the side flaps of said box blank descend, bevelled upwardly toward the rear, the base of said magazine adjustable, so that its lower forward edges can be positioned, relative to said feed slide, to allow only one box blank to be extracted from said magazine by each forward movement of said feed slide; guide rods, supported by the base of said magazine, adapted to support a stack of box blanks and guide them into said delivery opening of said magazine, together with two telescoping, vertically reciprocated, independently operated plungers adapted to press a box blank against said feed slide.

47. In an automatic box machine the combination of a magazine, a feed slide provided with means to feed a blank from said magazine, to a position under a plurality of telescoping, vertically reciprocated tubes, one of said tubes provided with an expansible plunger adapted to press said blank against said slide; a central plunger operating through said expansible plunger adapted to press said blank against said slide independently of said expansible plunger, together with an ejector operated by said feed slide and adapted to eject said blank from said box machine after having been folded up around said expansible plunger and then released.

48. In an automatic box machine the combination of a horizontally reciprocated feed slide provided with slots, together with vertically reciprocated, independently operating telescoping tubes below the plane of said slide, said tubes provided with fingers adapted to pass through said slots.

49. In an automatic box machine the combination of a horizontally reciprocated feed slide provided with slots, together with vertically reciprocated, independently operating telescoping tubes below the plane of said slide, said tubes provided with fingers adapted to pass through said slots, guides for said tubes, lever and roller, adjustable rod, safety spring and lever, links and pin means for operating said tubes, substantially as shown.

50. In an automatic box machine the combination of a horizontally reciprocated feed slide provided with slots, together with vertically reciprocated, independently operating telescoping tubes below the plane of said slide, said tubes provided with fingers adapted to pass through said slots, and an internal guide and an external guide for said tubes.

51. In an automatic box machine the combination of a horizontally reciprocated feed slide provided with a recess, rectangular slots enclosing a rectangular portion of said slide in the bottom of said recess, together with vertically reciprocated, independently operating, telescoping tubes below the plane of said slide, two of said tubes, each provided with fingers at its upper end adapted to pass through said slots in said slide as said tubes are reciprocated.

52. In an automatic box machine the combination of a horizontally reciprocated feed slide, provided with a recess, rectangular slots enclosing a rectangular area of said slide in the bottom of said recess, together with vertically reciprocated, independently operating, telescoping tubes below the plane of said slide, two of said tubes, each provided with flexible fingers at its upper end, adapted to pass through said slots in said slide as said tubes are reciprocated.

53. In an automatic box machine the combination of a horizontally reciprocated feed slide, provided with a recess, rectangular slots enclosing a rectangular portion of said slide in the bottom of said recess, together with vertically reciprocated, independently operating, telescoping tubes below the plane of said slide, two of said tubes, each provided with fingers at its upper end, adapted to pass through said slots in said slide as said tubes are reciprocated and a central guide for said tubes provided at its upper end with a rectangular guide for said fingers.

54. In an automatic box machine the combination of a horizontally reciprocated feed slide, provided with a recess, rectangular slots enclosing a rectangular portion of said slide in the bottom of said recess, together with vertically reciprocated, independently operating, telescoping tubes below the plane of said slide, two of said tubes, each provided with fingers at its upper end adapted to pass through said slots in said slide as said tubes are reciprocated and a central guide for said tubes provided at its upper end with a rectangular guide for said fingers, said rectangular guide being of approximately the same dimensions as the portion of said slide included between the rectangular slots in said slide, and also of the lateral external dimensions of the box to be covered.

55. In an automatic box machine the combination of a horizontally reciprocated feed slide, provided with a recess, slots enclosing a portion of said slide in the bottom of said recess, together with vertically reciprocated, independently operating, telescoping tubes, below the plane of said slide, two of said tubes each provided with fingers at its upper end adapted to pass through said slots in said slide, as said tubes are reciprocated, and a central guide for said tubes, provided at its upper end, with a guide for said fingers.

56. In an automatic box machine the combination of a horizontally reciprocated feed slide, provided with a recess, two sets of slots each enclosing a rectangular portion of said slide, together with vertically reciprocated independently operating telescoping tubes below the plane of said feed slide, said tubes each provided with fingers adapted to pass through said slots in said slide and a central guide for said tubes and fingers.

57. In an automatic box machine the combination of a horizontally reciprocated feed slide provided in its upper surface with a recess adapted to receive a box blank, with a rib at each side adapted to engage the edges of said box blank, with ribs projecting from the bottom of said recess adapted to engage the rearward edges of said box blank, and with rectangular slots through the bottom of said recess enclosing a rectangular area together with vertically reciprocated, independently operating telescoping tubes, below the plane of said slide, said tubes provided with fingers adapted to pass through the said slots in said slide.

58. In an automatic box machine the combination of a horizontally reciprocated feed slide provided with a recess in its upper surface adapted to receive a box blank, with a rib at each side adapted to engage the edges of said box blank, with ribs projecting from the bottom of said recess adapted to engage the reaward edges of said box blank, and with rectangular slots through the bottom of said recess, enclosing a rectangular area, together with vertically reciprocated independently operated telescoping tubes below the plane of said slide provided with fingers adapted to pass through the said slots in said slide and a central guide for said tubes and fingers.

59. In an automatic box machine a horizontally reciprocated feed slide, as described, a plurality of vertically reciprocated, independently operating, telescoping tubes above the plane of said slide and a plurality of vertically reciprocated, indpendently operating telescoping tubes below the plane of said slide, said last named tubes provided with fingers adapted to pass through slots in said slide, and a central guide for said tubes and fingers.

60. In an automatic box machine a horizontally reciprocated feed slide, as described, a plurality of vertically reciprocated, independently operating, telescoping tubes above the plane of said slide, one of them provided with an expansible plunger as described and a plurality of vertically reciprocated, independently operating telescoping tubes below the plane of said slide, said last named tubes provided with fingers adapted to pass through slots in said slide and a central guide for said tubes and fingers.

61. In an automatic box machine a horizontally reciprocated feed slide, as described, a plurality of vertically reciprocated, independently operating, telescoping tubes above the plane of said slide, one of them provided with an expansible plunger. as described, together with a central plunger and a plurality of vertically reciprocated, independently operating telescoping tubes below the plane of said slide, said last named tubes provided with fingers adapted to pass through said slots in said slide, and a central guide for said tubes and fingers.

62. In an automatic box machine the combination of a horizontally reciprocated feed slide, as described, a plurality of vertically reciprocated, independently operating, telescoping tubes above the plane of said slide, one of them provided with an expansible plunger, as described, together with a central plunger operating through said expansible plunger and a plurality of vertically reciprocated, independently operating telescoping tubes below the plane of said slide, said last named tubes provided with fingers adapted to pass through said slots in said slide, and a central guide adjustably mounted so that the top of said guide supports the portion of said feed slide included between the slots in said slide both in its forward and rear positions.

63. In an automatic box machine the combination of a horizontally reciprocated feed slide, as described, a plurality of vertically reciprocated, independently operating, telescoping tubes above the plane of said slide, one of them provide with an expansible plunger, as described, together with a central plunger operating through said expansible plunger; a magazine as described; an ejector as described and a plurality of vertically reciprocated, independently operating telescoping tubes below the plane of said slide, said last named tubes provided with fingers adapted to pass through slots in said slide, and a central guide for said tubes and fingers, said central guide adjustably mounted so that the top of said guide supports one of the portions of said feed slide included between the slots in said slide at each end of its forward and return stroke.

64. In an automatic box machine the combination of a horizontally reciprocated slide, a plurality of vertically reciprocated, independently operating, telescoping tubes, one provided with a plunger, others with clips, adapted to slip over and hold the sides of a box blank firmly against the sides of said plunger.

65. In an automatic box machine the combination of a horizontally reciprocated feed slide, a plurality of vertically reciprocated, independently operating, telescoping tubes, one provided with a plunger, others with flexible clips, adapted to slip over and hold the sides of a box blank firmly against the sides of said plunger.

66. In an automatic box machine the combination of a horizontally reciprocated feed slide, a plurality of vertically reciprocated, independently operating, telescoping tubes, one provided with a plunger, two of said tubes each provided with clips adapted to move downwardly, slip over and hold the sides and ends of a box blank firmly against said plunger.

67. In an automatic box machine the combination of a horizontally reciprocated feed slide, a plurality of vertically reciprocated independently operating, telescoping tubes, one provided with a plunger, two of said tubes each provided with clips adapted to move downwardly, slip over and hold the sides and ends of a box blank firmly against said plunger together with means for reciprocating said plunger and clips so that a box blank when held on said plunger by said clips may be raised or lowered with said plunger.

68. In an automatic box machine the combination of a plunger, a magazine, a horizontally reciprocated feed slide provided with means for delivering a box blank from said magazine to said plunger and reciprocating fingers operating from below up through slots in said slide adapted to fold sides of said box blank up against said plunger, and a set of clips operating above said slide adapted to clamp said box sides against said plunger when said lower fingers are withdrawn and to move with said plunger when it moves upwardly carrying said box blank with it.

69. In an automatic box machine the combination of a plunger, a magazine, a horizontally reciprocated feed slide provided with means for delivering a box blank from said magazine to said plunger and reciprocating fingers operating from below, up through slots in said slide, adapted to fold sides of said box blank up against said plunger, and a set of clips operating above said slide adapted to clamp said box sides against said plunger when said lower fingers are withdrawn, and to move with said plunger when it moves upwardly, carrying said box blank with it, together with a central plunger so actuated as to hold a box blank or covered box blank firmly against said slide when said plunger is raised.

70. In an automatic box machine the combination of a plunger, a magazine, a horizontally reciprocated feed slide provided with means for delivering a box blank from said magazine to said plunger; also means on said slide for receiving and delivering under said plunger, alternately with said box blank, a gummed box label; lower reciprocating side and end fingers adapted to operate upwardly through slots in said slide, to fold said box blank up against said plunger; upper reciprocated clips to hold said box blank folded up about said plunger; said lower fingers also adapted to operate upwardly through said label slots in said slide to fold the sides of said label up against the sides of said box blank.

71. In an automatic box machine the combination of a horizontally reciprocated feed slide, a plurality of vertically reciprocated, independently operating telescoping tubes, one provided with an expansible plunger, a central plunger with an extended foot operating through said expansible plunger, two of said tubes provided with clips adapted to clamp the sides of a box blank against the sides of said expansible plunger, two of said tubes provided with means to actuate pivoted top folders adapted to turn the edges of a box label inwardly over the top edges of said box blank, one of said tubes provided with means to actuate pivoted end folders adapted to fold the end flaps of said label around the corners of said folded box blank; a magazine adapted to feed a box blank to said feed slide at each reciprocation; an ejector as described; together with two vertically reciprocated, independently operating telescoping tubes positioned below the plane of said slide, each provided with fingers adapted to operate upwardly through slots in said feed slide to fold a box blank up around said expansible plunger, and to fold a box label up around said folded box blank.

72. In an organized automatic box machine, the combination of the box covering mechanism with its horizontally reciprocated feed slide and a reciprocating carriage, guides therefor and means for operating said carriage so that it is directly over said slide when it is in its forward position and said carriage is at one end of its travel.

73. In an organized box machine, the combination of the box covering mechanism with its horizontally reciprocated feed slide and a reciprocated carriage, operating means and guides therefor said carriage provided with a marginal die on its lower face.

74. In an organized automatic box machine, the combination of the box covering mechanism with its horizontally reciprocated feed slide and a reciprocated carriage, operating means and guides therefor, said carriage provided with a marginal die on its lower face, said die plate conforming in outline to that of box label.

75. In an organized automatic box machine, the combination of the box covering mechanism with its horizontally reciprocated slide and a reciprocated carriage, operating means and guides therefor, said carriage provided with a marginal die having its center removed, but conforming in outline to said box label so that its impression on said label would leave a marginal imprint.

76. In an organized automatic box machine, the combination of the box covering mechanism with its horizontally reciprocated feed slide and a reciprocated carriage, operating means and guides therefor, said carriage provided with a detachable marginal die with means for attaching and detaching same.

77. In an organized box machine, the combination of the box covering mechanism with its horizontally reciprocated feed slide and a reciprocated carriage, operating means and guides therefor, said carriage provided with a detachable marginal die adapted to be carried by said carriage into contact with a gumming device adapted to coat said die plate with adhesive.

78. In an automatic box machine the combination of a carriage, guides and reciprocating means therefor, said carriage provided with a detachable marginal imprint die, a vertical reciprocating plunger operating through said die and carriage and means for reciprocating said plunger at any position of said carriage.

79. In an automatic box machine the combination of a carriage, guides and reciprocating means therefor, said carriage provided with a detachable marginal imprint die, a vertical reciprocating plunger operating through said die and carriage, means for reciprocating said plunger at any position of said carriage, said plunger provided with a head adapted by suction means to hold a box label against its face, during the motion of said carriage, or said plunger or both.

80. In an automatic box machine the combination of a carriage, guides and reciprocating means therefor, said carriage provided with a detachable marginal imprint die, a vertical reciprocating plunger operating through said die and carriage, means for reciprocating said plunger at any position of said carriage, said plunger provided with a suction head and attached through said plunger to suction means for controlling said suction.

81. In an automatic box machine the combination of a carriage, guides and reciprocating means therefor, said carriage provided with a detachable marginal imprint die a vertical reciprocating plunger operating through said die and carriage, means for reciprocating said plunger at any position of said carriage, said plunger provided with a suction head and attached through said plunger to suction means, means for controlling said suction together with means for preventing the rotation of said plunger about its axis.

82. In an organized automatic box machine the combination of the horizontally reciprocated feed slide, a horizontally reciprocated carriage provided with a detachable marginal die together with a gumming device adapted to coat said die, as it passes, with an adhesive.

83. In an organized automatic box machine the combination of the box covering mechanism, the horizontally reciprocated feed slide, a horizontally reciprocated carriage provided with a detachable marginal die together with a gumming device adapted to coat said die, as it passes, with an adhesive.

84. In an organized automatic box machine the combination of the box covering mechanism, the magazine described, the horizontally reciprocated feed slide, a horizontally reciprocated carriage provided with a detachable marginal die together with a gumming device adapted to coat said die, as it passes, with an adhesive.

85. In an organized automatic box machine the combination of the box covering mechanism, the magazine described, the ejector described, the horizontally reciprocated feed slide, a horizontally reciprocated carriage provided with a marginal die together with a gumming device adapted to coat said die, as it passes, with an adhesive.

86. In an organized automatic box machine the combination of the box covering mechanism, the magazine described, the ejector described, the horizontally reciprocated feed slide, the carriage, suction plunger and marginal die as described together with gumming means to coat said die with adhesive, and means for the operation of the above.

87. In an automatic box machine, the combination of a horizontally reciprocated carriage provided with a marginal die, and a gumming device comprising a rotatably mounted glue roll within a tank, adjustable means for scraping excess glue from said glue roll, a rotatable transfer roller pivotally mounted and means for placing it in rolling contact with said glue roll, alternately in rolling contact, with said passing marginal die.

88. In an automatic box machine the combination of a horizontally reciprocated carriage provided with a marginal die, and a gumming device comprising a rotatably mounted glue roll within a tank, means for rotating said glue roll, said tank provided with a water bath and means for heating, means for scraping excess glue from said glue roll, a rotatable transfer roller pivotally mounted and means for placing it in rolling contact with said glue roll, alternately, in rolling contact, with said passing marginal die.

89. In an automatic box machine the combination of a carriage, guides and reciprocating means therefor, said carriage provided with a detachable marginal imprint die, a vertical reciprocating plunger operating through said die and carriage, means for reciprocating said plunger at any position of said carriage, said plunger provided with a suction head attached through said plunger to suction means for controlling said suction, together with a label feeder adapted to present a label to said die, and to deliver said label to said suction head after imprint of said die on said label.

90. In an organized automatic box machine the combination of the box covering mechansm, the horizontally reciprocated feed slide, a horizontally reciprocated carriage provided with a detachable marginal die, a gumming device adapted to coat said die, as it passes, with an adhesive together with a label feeder adapted to present a label to said die for imprint.

91. In an organized automatic box machine the combination of the box covering mechanism, the magazine described, adapted to feed a box blank, the horizontally reciprocated feed slide, a horizontally reciprocated carriage provided with a detachable marginal die; gumming means adapted to coat said die, as it passes, with an adhesive together with a label feeder adapted to present a label to said die for imprint.

92. In an organized automatic box machine the combination of the box covering mechanism, the magazine described adapted to feed a box blank, the ejector described, adapted to eject a box or folded box blank, the horizontally reciprocated carriage provided with a detachable marginal die; a gumming device adapted to coat said die, as it passes, with an adhesive together with a label feeder adapted to present a label to said die for imprint.

93. In an organized automatic box machine the combination of the box covering mechanism, the magazine described, adapted to feed a box blank, the ejector described, adapted to eject a box or folded box blank, the horizontally reciprocated feed slide, the carriage, the suction plunger and the marginal die as described, a gumming device to coat said die with adhesive together with a label feeder adapted to present a label to said die, and to deliver said label to said suction plunger after imprint of said die on said label said suction plunger adapted, in turn, to deliver said label to said feed slide.

94. In an organized automatic box machine the combination of the carriage with its guides, a suction plunger and a marginal die as described carried on said carriage; gumming means as described, adapted to coat said die with adhesive, together with the label feeder as described adapted to present a label to said die for imprint, and to deliver said label to said suction plunger.

95. In an organized automatic box machine the combination of the box covering mechanism, the magazine, adapted to feed a box blank, the ejector, adapted to eject a box or folded box blank, the horizontally reciprocated feed slide, the carriage, the suction plunger and marginal die carried thereon, the gumming device adapted to coat said die with adhesive, together with the label feeder adapted to present a label to said die for imprint and to deliver said label to said suction plunger, and means for operating the above all substantially as described.

96. In an automatic box machine the combination of a vertically reciprocated tube provided at its lower end with an expansible plunger comprising a head, a shell adapted to fit over said head, means integral with said head adapted to press the sides of said shell outwardly when said head is forced into said shell together with a central plunger operating through said tube, plunger and shell.

97. In an automatic box machine the combination of a vertically reciprocated tube provided at its lower end with an expansible plunger comprising a head, a shell adapted to fit over said head, means integral with said head adapted to press the sides of said shell outwardly when said head is forced into said shell; means to prevent said shell from slipping off of said head; together with a central plunger operating through said tube, plunger and shell.

98. In an automatic box machine the combination of a vertically reciprocated tube provided at its lower end with an expansible plunger comprising a head, a shell adapted to fit over said head, means integral with said head adapted to press or expand the sides of said shell outwardly when said head is forced into said shell; means to prevent said shell from slipping off said head; means to release said shell from said expanding means of said head, together with a central plunger operating through said tube, plunger and shell.

99. In an automatic box machine the combination of a vertically reciprocated tube provided at its lower end with an expansible plunger comprising a head, a shell adapted to fit over said head, means integral with said head adapted to press or expand the sides of said shell outwardly when said head is forced into said shell; means to prevent said shell from slipping off said head; means to release said shell from said expanding means of said head; a central plunger operating through said tube, plunger and shell, together with a horizontally reciprocated feed slide against which, one, or both of said plungers are adapted to press a blank.

100. In an automatic box machine the combination of a vertically reciprocated tube provided at its lower end with an expansible plunger comprising a head, a shell adapted to fit over said head, means integral with said head adapted to press or expand the sides of said shell outwardly when said head is forced into said shell; means to prevent said shell from slipping off said head; means to release said shell from said expanding means of said head; a central plunger, with an extended foot, operating through said tube, head and shell, together with a horizontally reciprocated feed slide against which said central plunger is adapted to press a blank.

101. In an automatic box machine, a horizontally reciprocated feed slide, ways for same, said slide provided in its upper surface with a recess adapted to receive a box blank, with a rib at each side adapted to engage the sides of said box blank, with pins projecting from the bottom of said recess adapted to engage the rearward edges of said box blank, with rectangular slots through the bottom of said recess enclosing a rectangular area with suction means adjacent to said slots adapted to maintain a box blank in said recess; and further provided at another portion of said feed slide with similar rectangular slots enclosing a rectangular area, with suction means adjacent to said slots adapted to maintain a box label in position on said slide; means for determining and limiting the travel of said slide together with two telescoping plungers, one or both adapted to press a box blank against said slide.

102. In an automatic box machine the combination of a feed slide provided with a recess adapted to receive a box blank, a magazine adapted to feed a box blank, by gravity, into said recess; two telescoping plungers under which said slide is adapted to carry and position said box blank, one or both of said plungers adapted to hold said box blank against said slide together with means for supporting and operating the above.

103. In an automatic box machine the combination of a horizontally reciprocated feed slide provided with a recess adapted to receive a box blank, a magazine provided with a lower opening through its base adapted to pass a box blank, the walls of said opening provided with vertical ribs, the lower front edges of said opening through which the side flaps of said box descend, bevelled upwardly toward the rear, the base of said magazine adjustable, so that its lower forward edges can be positioned, relative to said feed slide, to allow only one box blank to be extracted from said magazine by each forward movement of said slide together with guide rods supported by the base of said magazine adapted to support a stack of box blanks and guide them into said delivery opening of said magazine; two telescoping plungers under which said slide is adapted to carry and position said box blank, one or both of said plungers adapted to hold said box blank against said feed slide and means for operating all of the above.

104. In an automatic box machine, the combination of a table, a horizontally reciprocated feed slide provided with a recess adapted to slide in guideways in said table, a magazine, supported on said table, adapted to feed box blanks, singly, into a recess in said slide, together with two telescoping, vertically reciprocated, independently operated plungers under which said slide is adapted to position a box blank.

105. In an automatic box machine, the combination of a table, a horizontally reciprocated feed slide adapted to slide in guideways in said table; means for feeding a gummed label to said feed slide, together with two telescoping, vertically reciprocated, independently operated plungers under which said feed slide is adapted to position a gummed box label.

106. In an automatic box machine, the combination of a table, a horizontally reciprocated feed slide adapted to slide in guideways in said table; a magazine supported on said table adapted to feed a box blank into a recess in said slide; a plunger above said slide under which said box blank is positioned when said slide moves forward; means for feeding a gummed box label to said feed slide, when in forward position, said slide adapted to position said box label under said plunger when said slide moves backward.

107. In an automatic box machine the combination of a vertically reciprocated plunger, means for feeding a box blank under said plunger; said feeding means provided with openings; together with means operating upwardly through said openings in said feeding means to fold the sides of said box blank up against said plunger.

108. In an automatic box machine the combination of a vertically reciprocated plunger, means for feeding a box blank under said plunger; said blank feeding means provided with openings; folding means operating upwardly through said openings in said box blank feeding means to fold the sides of said box blank up against said plunger; means to hold said box blank folded about said plunger when it rises; means to feed a gummed box label under said raised plunger; said label feeding means provided with openings through which said folding means are adapted to operate upwardly to fold the sides of said box label upwardly against the sides of said folded box blank, after said plunger descends and presses said box blank against said box label.

109. In automatic box machine the combination of a vertically reciprocated plunger, means for feeding a box blank under said punger; said blank feeding means provided with openings; feeding means operating upwardly through said openings in said blank feeding means to fold the sides of said box blank up against said plunger; means to hold said box blank folded about said plunger when it rises; means to feed a gummed box label under said raised plunger; said label feeding means provided with openings through which said folding means are adapted to operate upwardly to fold the sides of said box label up against the sides of said folded box blank, after said plunger descends; means adapted to fold the end flaps of said sides of said label around the corners and against the ends of said folded box blank; together with means operating upwardly through said openings in said label feeding means to fold the ends of said label up against the ends of said folded box blank.

110. In an automatic box machine the combination of a vertically reciprocated plunger, means for feeding a box blank under said plunger; said blank feeding means provided with openings; lower folding means operating upwardly through said openings in said blank feeding means to fold the sides of a box blank up against said plunger; means to hold said box blank folded about said plunger when it rises; means to feed a gummed box label under said raised plunger; said label feeding means provided with openings through which said lower folding means are adapted to operate upwardly to fold the sides of said box label up against the sides of said folded box blank after said plunger descends; means adapted to fold the end flaps of said label around the corners and against the ends of said folded box blank; said lower folding means adapted to operate upwardly through said openings in said label feeding means to fold the ends of said label up against the ends of said folded box blank together with means to fold the upstanding edges of said label, first, over the side top edges and lastly over the end top edges of said folded box blank.

111. In an automatic box machine the combination of an outer and inner reciprocating plunger; means for feeding a box blank under said plunger; said blank feeding means provided with openings; lower folding means, operating upwardly through said openings in said box blank feeding means, to fold the sides of said box blank up against said outer plunger; means to hold said box blank folded about said outer plunger when both plungers initially rise; means to feed a gummed box label under said raised plungers; said label feeding means provided with openings through which said lower folding means are adapted to operate upwardly to fold the sides of said box label up against the sides of said folded box blank, after said plungers descend; means adapted to fold the end flaps of said sides of said label, around the corners, and up against the ends of said folded box blank; said lower folding means adapted to operate upwardly through said openings in said label feeding means to fold the ends of said label up against the ends of said folded box blank together with means to fold the upstanding edges of said label, after said outer plunger has been withdrawn upwardly, first, over the side top edges, and lastly over the end top edges of said folded box blank; said outer plunger adapted to redescend and press said fold'd over upstanding label edges down into, and against the inner walls of said folded box blank.

112. In an automatic box machine the combination of a central plunger, an outer expansible plunger and means to operate each independently of the other; means for feeding a box blank under said plungers; said blank feeding means provided with openings; lower folding means operating upwardly through said openings in said box blank feeding means, to fold the sides of said box blank up against the outer plunger; means to hold said box blank folded about said outer plunger when both plungers initially rise; means to feed a gummed box label under said raised plungers; said label feeding means provided with openings through which said lower folding means are adapted to operate upwardly to fold the sides of said box label up against the sides of said folded box blank, after said plungers descend; means adapted to fold the end flaps of said sides of said label, around the corners, and against the ends of said folded box blank; lower folding means, operating upwardly through said openings in said label feeding means, adapted to fold the ends of said label up against the ends of said folded box blank, said lower folding means being adapted to provide a rigid external mould inside of which said box is completed and held true to form and shape; means to fold the upstanding edges of said label, after said outer plunger has been withdrawn upwardly, first, over the side top edges, and lastly over the end top edges of said folded box blank, said outer expansible plunger adapted to redescend and to press said folded-over up-standing label edges down into, and against the inner walls of said folded box blank.

113. In an automatic box machine the combination of a plunger, means to operate said plunger; means to feed a box blank under said plunger; said blank feeding means provided with openings; together with means operating upwardly through said openings in said box blank feeding means, to form, in conjunction with said box blank feeding means, a rigid mould about said plunger.

114. In an automatic box machine the combination of a plunger, means to operate said plunger; means to feed a box blank under said plunger; said blank feeding means provided with openings; together with means, operating upwardly through said openings in said blank feeding means, to form, in conjunction with said box blank feeding means, a rigid mould about said plunger together with means integral with said plunger adapted to close said rigid mould and make the enclosed box blank conform to the mould.

115. In an automatic box machine the combination of an expansible plunger, means to operate said plunger; means to feed a box blank under said plunger; said blank feeding means provided with openings; means operating upwardly through said openings in said blank feeding means, to form, in conjunction with said box blank feeding means, a rigid mould about said plunger, said expansible plunger adapted to press said box blank outwardly against the inner walls of said rigid mould.

116. In an automatic box machine the combination of an expansible plunger, a central plunger with an extended foot operating through said expansible plunger with means to independently operate said plungers; means to feed a box blank under said plungers; said blank feeding means provided with openings; means operating upwardly through said openings in said blank feeding means to form, in conjunction with said box blank feeding means, a rigid mould about said plungers, said central plunger adapted to hold said box blank within said mould when said expansible plunger is withdrawn, and said expansible plunger, when it redescends into said mould, adapted to expansion of its sides to reduce the space between said sides and the interior walls of said rigid mould.

117. In an automatic box machine the combination of an expansible plunger, a central plunger with an extended foot operating through said expansible plunger with means to independently operate said plungers; means to feed a box blank under said plungers; said blank feeding means provided with openings; means operating upwardly through said openings in said blank feeding means to fold said blank up around said expansible and said central plungers; means to hold said box blank on said plungers when they rise; means to feed a gummed box label under said raised plungers and box blank; said label feeding means provided with openings; means operating upwardly through said openings in said label feeding means to fold said label up around said formed box skeleton after said plungers and box blank descend upon said gummed label; means to fold the end flaps of said label around the ends of said box skeleton before the ends of said label are folded up against the ends of said box skeleton; means to fold the top edges of said label, after said expansible plunger is withdrawn from said box skeleton, over the top edges of said box skeleton; said label top edge folding means adjustable relative to the top edges of said box skeleton; said expansible plunger being adaptable to redescend and push said turned over top label edges down into the box skeleton, and to expand and fix the said label edges to the inner walls of said box skeleton under pressure, thus completing a finished box.

118. In an automatic box machine the combination of a plunger; means to operate said plunger; means to feed a box blank and a gummed box label alternately under said plunger; said blank and label feeding means provided with openings; means operating upwardly through said openings in said box blank and said box label feeding means to form a rigid mould about the sides of said plunger together with top edge label folding means said folding means adjustable relative to the top edges of said rigid mould.

119. In an automatic box machine the combination of a horizontally reciprocated feed slide and the box covering mechanism, said feed slide adapted to feed and convey a box blank to said box covering mechanism on its forward stroke and to convey a box label to said box covering mechanism on its return stroke.

120. In an automatic box machine the combination of a plunger, means to operate said plunger; means to feed a box blank under said plunger; said blank feeding means provided with openings; together with means operating upwardly through said openings in said box blank feeding means, to form, in conjunction with said box blank feeding means, a mould about said plunger.

121. In an automatic box machine the combination of a plunger, means to operate said plunger; means to feed a box blank under said plunger; said blank feeding means provided with openings; together with means operating upwardly through said openings in said blank feeding means, to form, in conjunction with said box blank feeding means, a mould about said plunger together with means integral with said plunger adapted to close said mould and make the enclosed box blank conform to the mould.

122. In an organized automatic box machine the combination of a horizontally reciprocated carriage provided with an imprint die, means to coat said die with an adhesive, means to present a box label to said die for imprint; means to release said label from said die and to convey and deposit it on a label feeding mechanism adapted to convey and position said label under a plunger.

123. In an automatic box machine, the box covering mechanism comprising a feed slide, a vertically operable plunger above said slide adapted to hold a box blank against said slide and to constitute a form; said slide provided with openings; fingers, vertically operable through said openings, adapted to fold the sides of said box blank up against the sides of said plunger.

124. In an automatic box machine, the box covering mechanism comprising a feed slide adapted to receive a box blank on its rear stroke, and a gummed box label on its forward stroke; a vertically operable plunger above said slide; said feed slide adapted to position a box blank under said plunger on its forward stroke, and to position a box label under said plunger on its return stroke; said plunger adapted to descend upon said box blank and said box label alternately.

125. In an automatic box machine, the combination of a feed slide adapted to receive a box blank; a vertically operable plunger above said feed slide adapted to press said box blank against said slide; said slide provided with openings; fingers, vertically operable through said openings, adapted to fold the sides of said box blank up against the sides of said plunger; clamp fingers, vertically operable, adapted to hold said box blank sides firmly against said plunger, either when it rises or descends.

126. In an automatic box covering machine a device for turning the ends of a gummed box label around the vertical edges of a formed box blank and affixing said label ends thereto, comprising, in combination, a box form pivotally operable levers on opposite sides of said box form adapted to swing toward and away from said box form; each of said levers provided at each side with pivotally mounted roller yokes provided with rotatably mounted rollers; said roller yokes provided with spring means to maintain said rollers yieldingly pressed toward each other, with means to adjust said roller yokes to maintain said rollers in any required relation to the ends of said box form.

127. In an automatic box covering machine a device for turning the top edges of a box label, which has been folded up against the sides of a formed box blank, inwardly over the top edges of said formed box blank, comprising, in combination, a box form, levers pivotally mounted above and adjacent to each side of said box form, operable toward and away from said box form; each of said levers provided with a pivotally mounted blade and means to adjust the edge of said blade, vertically, relatively to the said box form.

128. In an automatic box covering machine the combination of a box blank and box label feed slide, a vertically operable plunger above said slide, said slide provided with openings; fingers, vertically operable through said openings; clamp fingers vertically operable, separately, and in conjunction with said plunger; pivotally operable label end turner levers mounted at each side of said plunger and provided with pivotally mounted roller yokes, each of said yokes provided with a rotatably mounted roller, said roller yokes yieldingly adjustable to maintain said rollers in a given path relatively to the plane of the end of said plunger together with top turner levers pivotally mounted at each side of said plunger, and operable toward and away from said plunger, each of said levers provided with a pivotally mounted blade, and means to adjust the edge of said blade vertically, and relatively to said plunger.

129. In an automatic box machine, a horizontally reciprocated carriage, provided with a marginal die, and to be positioned to contact with the upper label of a stack of labels, carried by a label feeder, comprising a vertically reciprocated platen, an intermediate platen, carried by, and automatically adjustable, vertically, in relation to said platen; a label platen, adapted to support said stack of labels, and resiliently supported from said intermediate platen; said label platen provided with means, actuated when said label platen is depressed on its resilient support, to prevent any change in relation of the intermediate platen to the vertically reciprocated platen together with a suction head, operating through said marginal die adapted to hold the top label of said stack of labels to itself, by suction, as said label feeder moves downwardly.

130. In an automatic box machine, a label feeder comprising a vertically reciprocated platen, an intermediate platen, carried by, and automatically adjustable, vertically, in relation to said platen; a label platen resiliently supported from said intermediate platen; means, comprising a reciprocated carriage provided with a marginal die, to present said marginal die, previously coated with adhesive to the top label, of a stack of labels carried on said label platen, on its upward reciprocation together with a suction head, operating through said marginal die, adapted to hold the top label of said stack of labels, to itself, by suction, as said platen moves downwardly.

131. In an automatic box machine, a label feeder comprising a vertically reciprocated platen, an intermediate platen, carried by, and automatically adjustable, vertically, in relation to said platen; a label platen resiliently supported from said intermediate platen; means, comprising a reciprocated carriage provided with a marginal die, to present said marginal die, previously coated with adhesive, to the top label, of a stack of labels carried on said label platen, on its upward reciprocation; a suction head, operating through said marginal die, adapted to hold the top label of said stack of labels to itself, by suction, as said platen moves downwardly together with means to move said suction head and marginal die to convey said label and deposit it on suitable receiving means.

Signed at Whitestone, in the county of Queens and State of New York, this 23rd day of December, A. D. 1918.

ROBERT H. FENN.

Witnesses:
LOUIS I. TULSCH,
CATHERINE LOESCHMANN.